US006522150B2

(12) United States Patent
Fujita

(10) Patent No.: US 6,522,150 B2
(45) Date of Patent: Feb. 18, 2003

(54) CORONA DISCHARGE APPARATUS

(75) Inventor: Tsukasa Fujita, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 09/833,816

(22) Filed: Apr. 13, 2001

(65) Prior Publication Data

US 2001/0030541 A1 Oct. 18, 2001

(30) Foreign Application Priority Data

Apr. 14, 2000 (JP) ....................................... 2000-114341

(51) Int. Cl.7 ............................................... G01N 27/60
(52) U.S. Cl. ....................................... 324/455; 324/464
(58) Field of Search ................................ 324/455, 464, 324/452, 453, 536, 765, 559, 458; 422/186.05; 427/536, 540

(56) References Cited

U.S. PATENT DOCUMENTS 5,106,589 A * 4/1992 Conrad .................. 422/186.15
5,394,092 A * 2/1995 Wentworth et al. ......... 324/455
5,963,041 A * 10/1999 Jones et al. ................. 324/455

FOREIGN PATENT DOCUMENTS

JP 5-339398 A 12/1993
JP 6-163143 A 6/1994
JP 6-336529 A 12/1994
JP 8-081573 A 3/1996
JP 10-067869 A 3/1998
JP 10-241827 A 9/1998
JP 10-309749 A 11/1998
JP 11-060759 A 3/1999
JP 11-279302 A 10/1999

* cited by examiner

*Primary Examiner*—N. Le
*Assistant Examiner*—James C. Kerveros
(74) *Attorney, Agent, or Firm*—Smith Patent Office

(57) ABSTRACT

A corona discharge apparatus includes a control unit and a discharge unit. The control unit has a baseboard with a main power source circuit located thereon. A CPU, a memory as well as other elements such as an attachment for a gas supply source are] installed in a housing of the control unit. The discharge unit has a high voltage generation circuit including a high-frequency step-up transformer installed in a housing of the discharge unit. A cable including a power line and a signal communication line is detachably connectable to the control unit and the discharge unit to electrically couple the units together through connectors secured to the respective housings. A gas guide tube is also detachably connectable to the discharge unit housing to feed a gas from the gas supply source into the discharge unit.

16 Claims, 30 Drawing Sheets

FIG. 33

| CONDITION | | | | |
|---|---|---|---|---|
| TERMINAL(81) | CONNECTED | DISCONNECTED | | |
| LOCK SWITCH | | ON | OFF | |
| ONE OF SWITCHES (EXCEPT SWITCH S5) IS OPERATED | | | YES | NO |
| STOP SWITCH S5 | EFFECTIVE | EFFECTIVE | PRIORITY | ALIVE |
| TIMER SWITCH S1 | INEFFECTIVE | INEFFECTIVE | INEFFECTIVE | ALIVE |
| POWER MODE SEL. SWITCH S2 | INEFFECTIVE | INEFFECTIVE | INEFFECTIVE | ALIVE |
| GAS SOURCE SEL. SWITCH S3 | INEFFECTIVE | INEFFECTIVE | INEFFECTIVE | ALIVE |
| TREATMENT PATTERN ALTERATION SWITCH S4 | INEFFECTIVE | INEFFECTIVE | INEFFECTIVE | ALIVE |
| START SWITCH S6 | EFFECTIVE | INEFFECTIVE | INEFFECTIVE | ALIVE |

FIG. 34
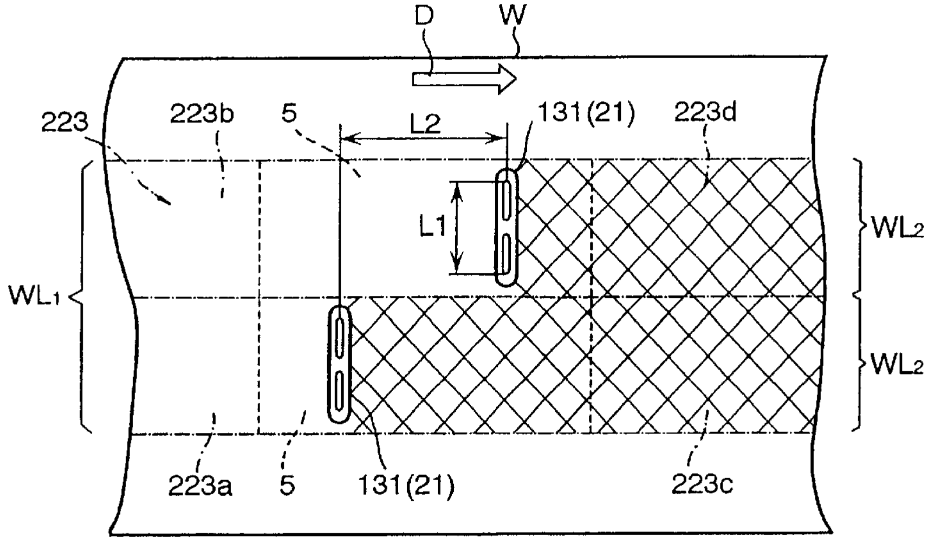
FIG. 35A
FIG. 35B
FIG. 35C
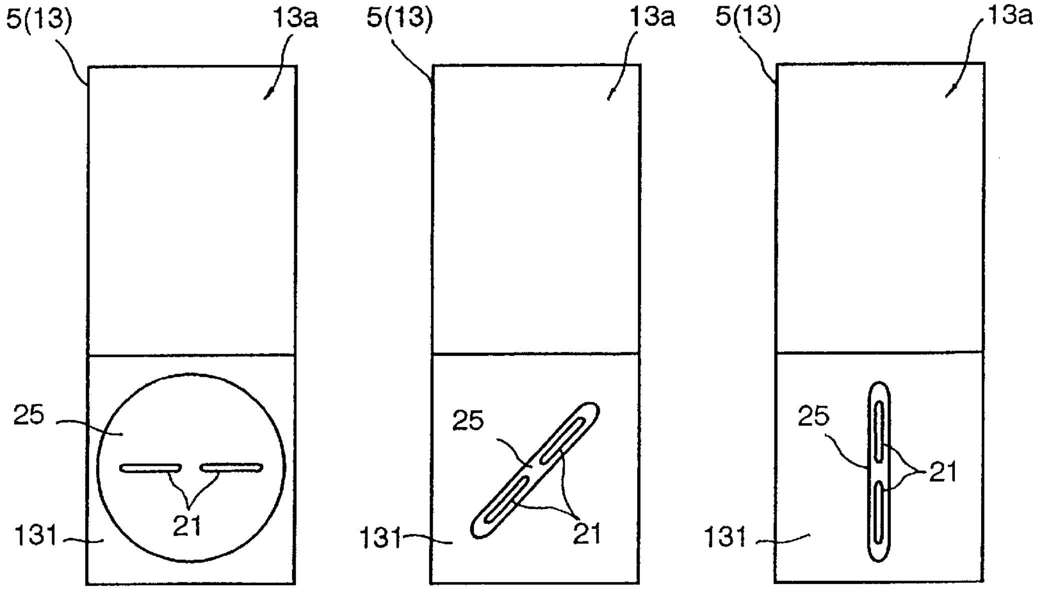

CORONA DISCHARGE APPARATUS

BACKGROUND OF THE INVENTION

1. Field of the Invention

The present invention relates to a corona discharge apparatus.

2. Description of the Related Art

Corona discharge apparatuses have been widely used to form irregularities, on the order of a micron, on the outer surface of a work object. Such a corona discharge apparatus can also be used to modify the outer surface of a work object.

Various corona discharge apparatuses for modifying the outer surface of a work object are known from, for example, Japanese Unexamined Patent Publication Nos. 6-163143, 8-081573, 10-241827, 10-309749, 11-060759 and 11-279302. One of the corona discharge apparatuses that have been available on the market comprises a discharge unit having a pair of electrodes disposed so that they face each other. While applying a discharge with a high voltage to the electrodes, a gas stream is injected between the electrodes to generate an arc-shaped corona discharge between the electrodes. This produces a plasma around the corona discharge. The plasma is applied to the work object in order to modify its surface qualities or its surface properties. The modification of the qualities and properties of the outer surface of the work object is performed by activating the outer surface of the work object with the plasma. As disclosed in Japanese Unexamined Patent Publication No. 6-163143, the plasma treatment is suitable for modification of surfaces of many materials such as plastics, paper, metals and ceramics.

The following examples are practical applications of plasma treatment:

(1) Applying plasma treatment to plastics, paper, metals or glass before printing on them. This increases adhesion of the print ink to the surface of the material.

(2) Applying plasma treatment to films before applying a binder to them. This increases adhesion of the binder to the surface of the film.

(3) Applying plasma treatment to base substances before coating them. This increases adhesion of the coating film with the surface.

(4) Applying plasma treatment to a work object transforms organic matter, which is a source of smudges, into $H_2O$ and $CO_2$. This removes smudges from the surface of the work object.

A corona discharge apparatus of this kind is generally configured such that a high discharge voltage is applied to a discharge unit from a control unit, including a high-voltage transformer circuit, through a high-tension cable. The high-tension cable is usually connected to the control unit and the discharge unit to electrically couple them together. Typically, it is cumbersome to manage the high-tension cable since the high-tension cable is made of a wire that is thicker than general electric wires and communication cables. It is also difficult to manage the high-tension cable because a firm sheath that protects it against breakage surrounds the wire.

Further, the high-tension cable that electrically couples the control unit and the discharge unit together has to have a sufficient extension length when the corona discharge apparatus is set up in a working site or a factory so that the discharge unit can be located adjacent to the work object. On the other hand, when considering where to locate the units from the standpoint of the factory, it is necessary to consider the length and maneuverability of the high-tension cable to determine the locations for the discharge unit and the control unit.

SUMMARY OF THE INVENTION

It is therefore an object of the present invention to provide a corona discharge apparatus including a connecting cable between a control unit and a discharge unit that is convenient and easily manageable.

It is another object of the present invention to provide a corona discharge apparatus that is flexible and allows installation of the control unit and the discharge unit in various work sites.

The foregoing objects of the present invention are accomplished by a corona discharge apparatus which comprises a discharge unit comprising a discharge electrode assembly having at least two discharge electrodes and high-voltage generation means for generating a high voltage. The high-voltage generation means is connected to the discharge electrode assembly for applying the high-voltage to the discharge electrodes and causing the discharge electrodes to generate a corona discharge. The apparatus also includes a control unit, separate from the discharge unit, for controlling the discharge unit. An electric cable which is detachably connected to at least one of the discharge unit and the control unit so as to electrically couple the discharge unit to the control unit.

The corona discharge apparatus thus configured has the discharge unit with the high-voltage generation means installed therein. The discharge unit and the control unit can be electrically coupled together by an ordinary cable comprising a power supply wire and a signal communication wire. This avoids connecting them together by means of a high-tension cable as was previously done. As a result, the manageability and maneuverability of the cable connecting the control unit and the discharge unit are significantly improved. Moreover, since the cable is detachable from both units, it is possible to connect the two units by a cable having a length that meets the actual conditions of the work site.

According to a preferred embodiment of the present invention, the corona discharge apparatus is adapted to generate an arc-shaped corona discharge between the discharge electrodes by applying a high voltage to the discharge electrodes while passing a gas between the discharge electrodes. This produces plasma around the corona discharge which is applied to the work object to modify a surface of the work object. The corona discharge apparatus comprises a discharge unit provided with the discharge electrodes and a high-voltage generation circuit for generating and applying a high voltage to the discharge electrodes so as thereby to generate the corona discharge. The corona discharge apparatus also comprises a control unit for controlling the discharge unit. The discharge unit and the control unit are both provided with connectors that allow a cable to be detachably connected to the discharge unit and the control unit. The cable electrically couples the discharge unit to the control unit. The discharge unit is also provided with a connector that allows a gas guide tube extending from a gas supply source to be detachably connected to the discharge unit.

The gas supply source, such as an air pump, an air blower, an air compressor and a gas bottle, may be installed in the control unit. In this case, the control unit is provided with a connector for detachably connecting the gas guide tube so that feed air can be supplied from the gas supply source to the discharge unit. The discharge unit is preferably provided with a gas flow sensor disposed in a gas flow passage in the discharge unit. The control unit is provided with control means that receives a signal representative of a gas flow rate from the gas flow sensor. The control unit provides feedback control to the gas supply source on the basis of the gas flow rate signal so as to maintain the gas injected through a gas outlet port of the discharge unit at a constant rate. This control system provides a constant rate of gas flow regardless of the length of the gas guide tube.

According to another preferred embodiment of the present invention, the discharge unit is provided with a temperature sensor installed therein to detect an internal temperature of the discharge unit. The control unit receives a signal representative of the internal temperature from the temperature sensor and controls the discharge unit, namely the high-voltage generation circuit, to control generation of high voltage on the basis of the internal temperature signal. Specifically, the control unit prohibits the high-voltage generation circuit from generating a high voltage when the internal temperature exceeds a predetermined upper limit temperature of, for example, 80° C. and/or a predetermined lower limit temperature of, for example −80° C. Prohibiting the high-voltage generation circuit from generating a high voltage when the interior of the discharge unit is higher than the upper limit temperature prevents a high-frequency step-up transformer from causing heat-deterioration. The high-frequency step-up transformer forms part of the high-voltage generation circuit and is generally sensitive to heat. Prohibiting the high-voltage generation circuit from generating a high voltage when the interior of the discharge unit is lower than the lower limit temperature prevents the discharge electrodes from causing an accident such as a short-circuit when frost forms on the discharge electrodes in cold weather.

BRIEF DESCRIPTION OF THE DRAWINGS

The above and other objects and features of the present invention will be clearly understood from the following description with respect to the preferred embodiment thereof when considered in conjunction with the accompanying drawings, wherein the same reference numerals have been used to denote the same or similar parts or elements, and in which:

FIG. 33 is a table showing patterns of operation when using double switch operation lockout control according to the present invention.

FIG. 34 is a schematic top view showing plasma treatment using a twin-head corona discharge apparatus according to the present invention.

FIG. 35A is a front view of a discharge electrode assembly according to the present invention.

FIG. 35B is a front view of another discharge electrode assembly according to the present invention.

FIG. 35C is a front view of still another discharge electrode assembly according to the present invention.

DETAILED DESCRIPTION OF THE PREFERRED EMBODIMENTS

Figure 1:
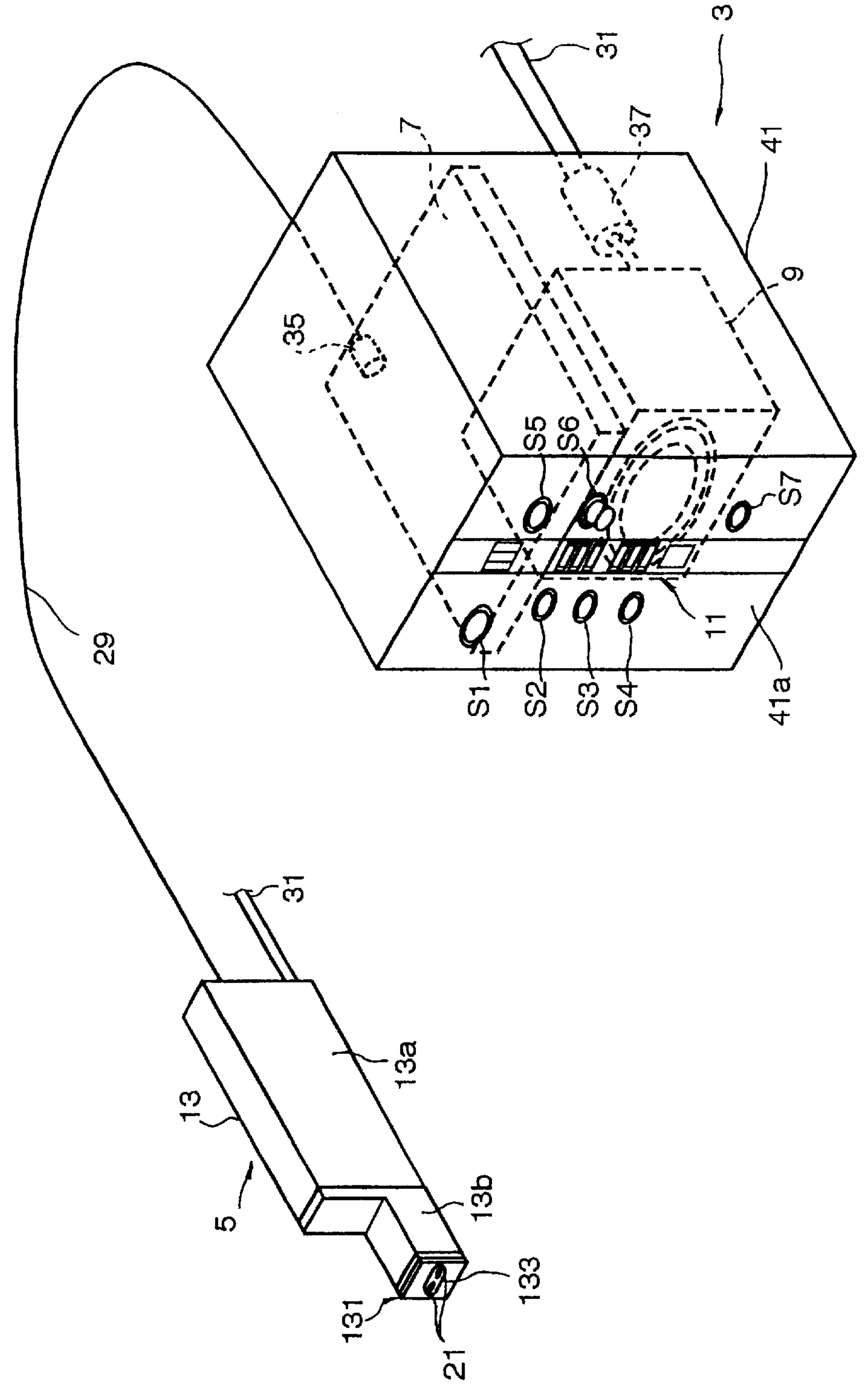
FIG. 1 is a schematic view of a corona discharge apparatus according to a preferred embodiment of the present invention.
Figure 2:
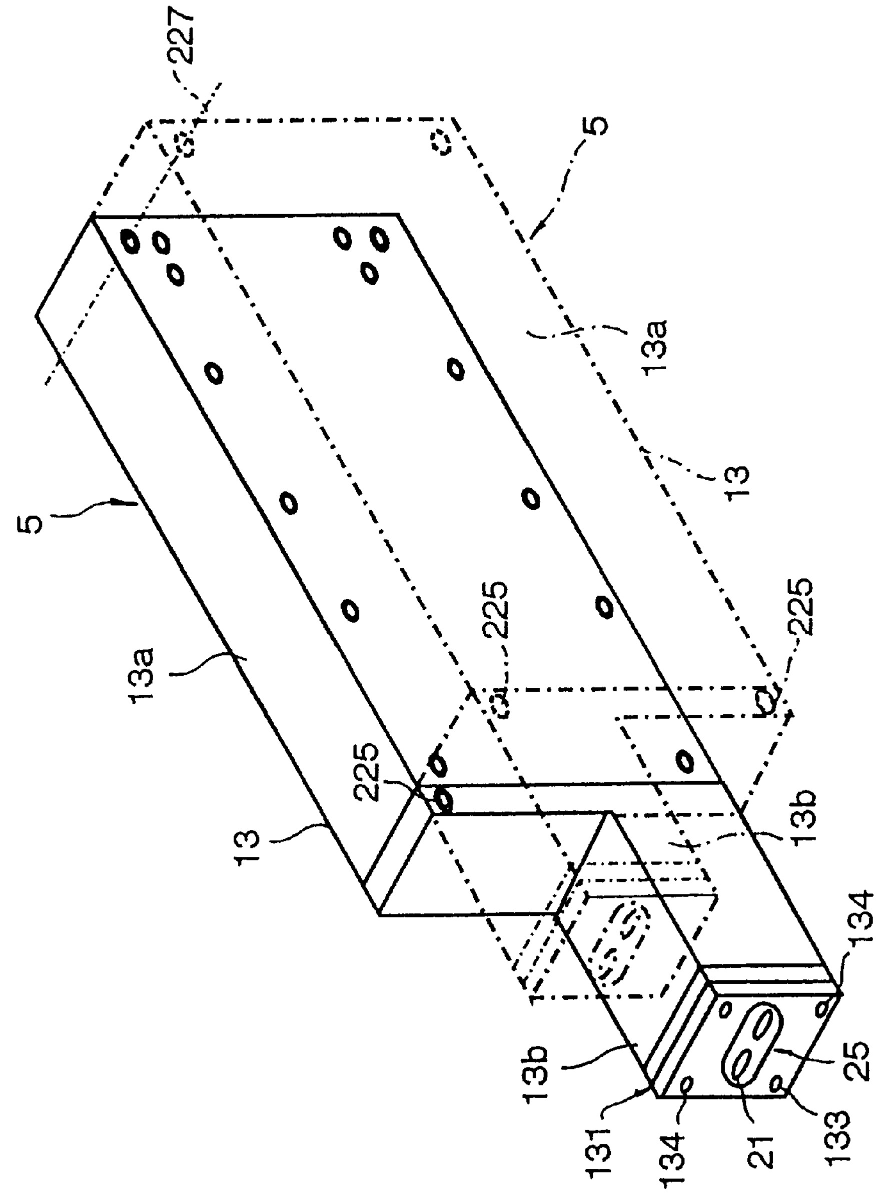
FIG. 2 is a front perspective view of a discharge unit of the corona discharge apparatus shown in FIG. 1.
Figure 3:
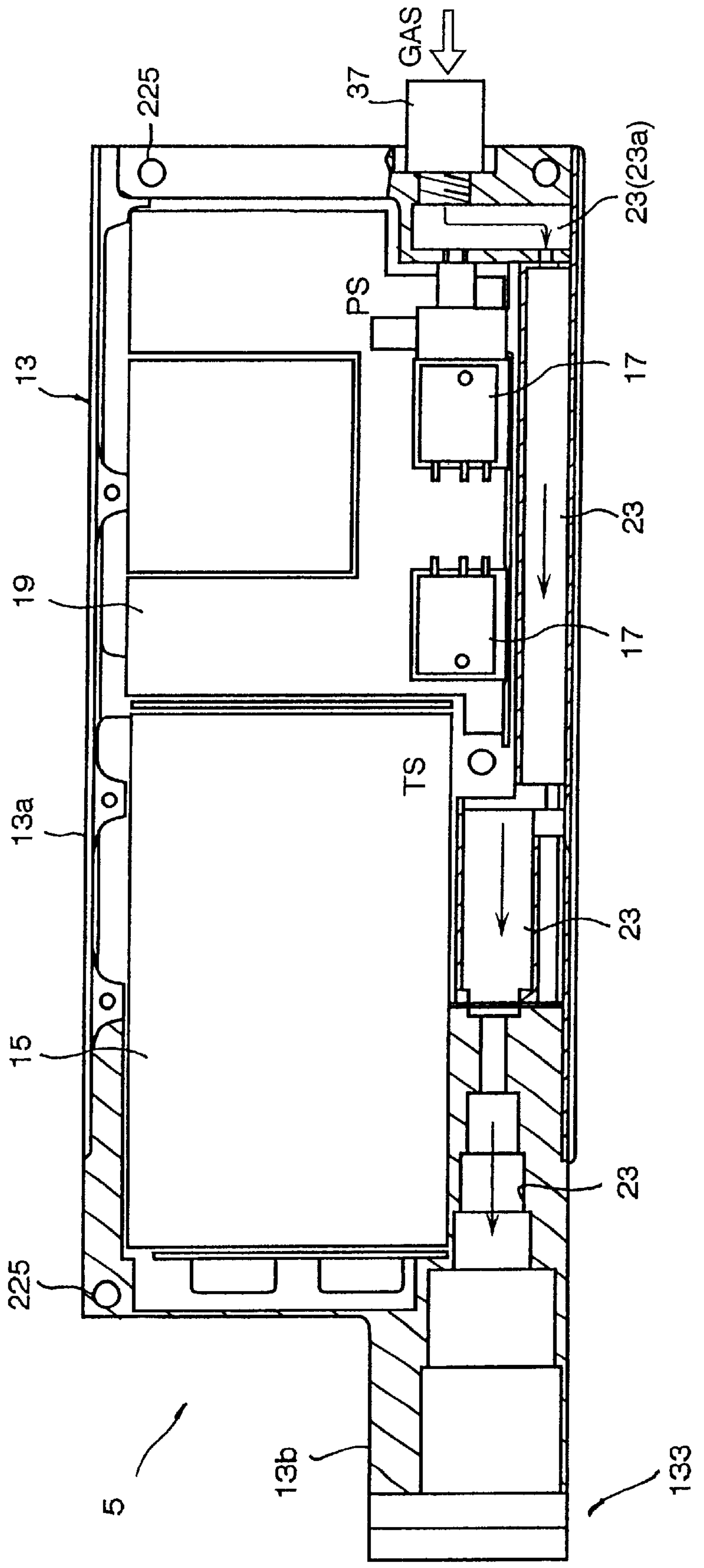
FIG. 3 is a longitudinal cross sectional view of the discharge unit shown in FIG. 2.

Referring to the drawings in detail, FIGS. 1 to 3 schematically show an entire corona discharge apparatus 1 in accordance with an embodiment of the present invention. The corona discharge apparatus 1 comprises a control unit 3 and a discharge head unit 5. The control unit 3 has a housing 41 in which a baseboard 7 with a control circuit installed thereon and an air pump 9 used as a gas supply source are received. The air pump 9 may be of a type having a pair of diaphragms disposed in its front and rear positions. This diaphragm type of air pump has an advantage in that it has a high reliability when used in connection with long-term use because of its small number of component parts. The control circuit includes a main power circuit, a CPU, a memory and other necessary parts. The front of the housing 41 has an operating panel 41*a* with switches S1–S7 and a display unit 11 arranged thereon. The switches S1–S7 include at least a discharge starting switch and a discharge interruption switch. The display unit 11 can display various digital information thereon including a discharge time.

Figure 4:
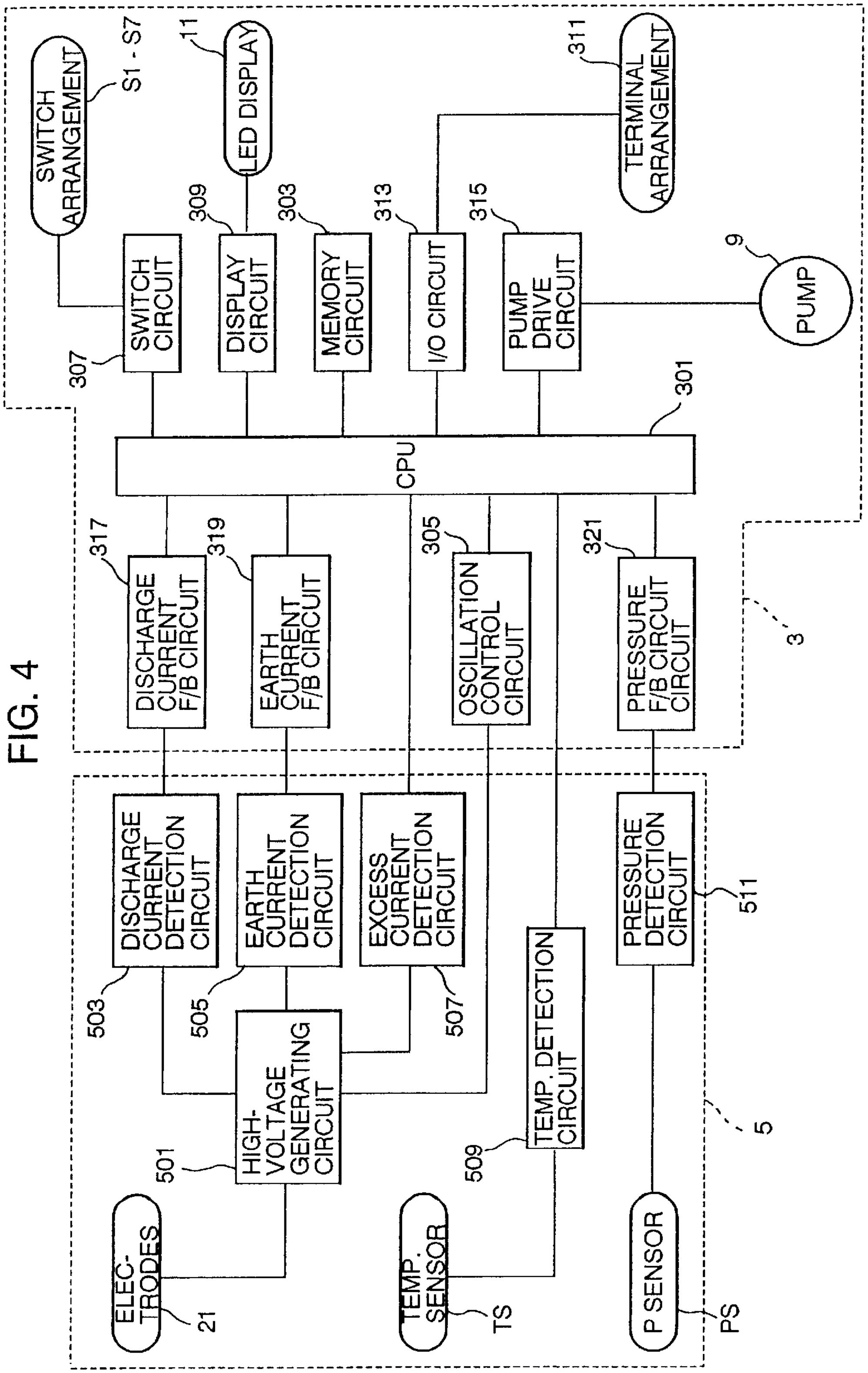
FIG. 4 is a block diagram showing an electric system of the corona discharge apparatus shown in FIG. 1.

FIGS. 2 and 3 show the discharge head unit 5 in detail. The discharge head unit 5 has a unit housing 13 comprising a main housing section 13*a* and a head housing section 13*b* at a front of the main housing section 13*a*. The main housing section 13*a* has a generally rectangular cross section and is provided with a baseboard 19 on which an oscillation circuit is installed. The oscillation circuit includes at least a high-voltage generating circuit 501 as shown in FIG. 4. The discharge head unit 5 includes a high-frequency step-up transformer 15 and a switching element 17 operative to apply and cut off current to a primary coil of the high-frequency step-up transformer 15. This arrangement permits a small size transformer to be used for generating a high voltage discharge so that the discharge unit 5 has a compact housing. A pair of discharge electrodes 21 is provided at the front of the head housing section 13*b*. The unit housing 13 is formed with a gas passage 23 extending adjacent to and along one of the sidewalls thereof as shown in FIG. 3. The gas passage 23 leads to a gas outlet port 25 opening in the head housing 13*b* as shown in FIG. 2. The gas outlet port 25 is shaped like a horizontal slot with its longitudinal axis extending in the direction of the width of the discharge head unit 5.

A high voltage discharge generated by the discharge unit 5 is applied to the discharge electrodes 21 as sine wave A.C. power in opposite phases, respectively. In typical application of the corona discharge apparatus 1, the voltage applied between the discharge electrodes 21 is approximately 8 kVrms with a frequency of approximately 20 to 25 kHz.

The control unit 3 and the discharge unit 5 are connected by means of a twin-lead cable 29 and a gas guide tube 31. The twin-lead cable includes a power cable and a control signal cable. Both the cable 29 and the gas guide tube 31 are detachably connected to the control unit 3 and the discharge unit 5 by means of connectors 35 and 37. The connectors for the discharge unit 5 are located in the rear side of the unit housing 13. In place of the air pump 9, a gas supply source, such as a factory fixed air pump and a $N_2$ gas bottle, may be used. In this case, the fixed air pump or the $N_2$ gas bottle may be connected to the discharge unit 5 by the gas guide tube 31.

Figure 40:
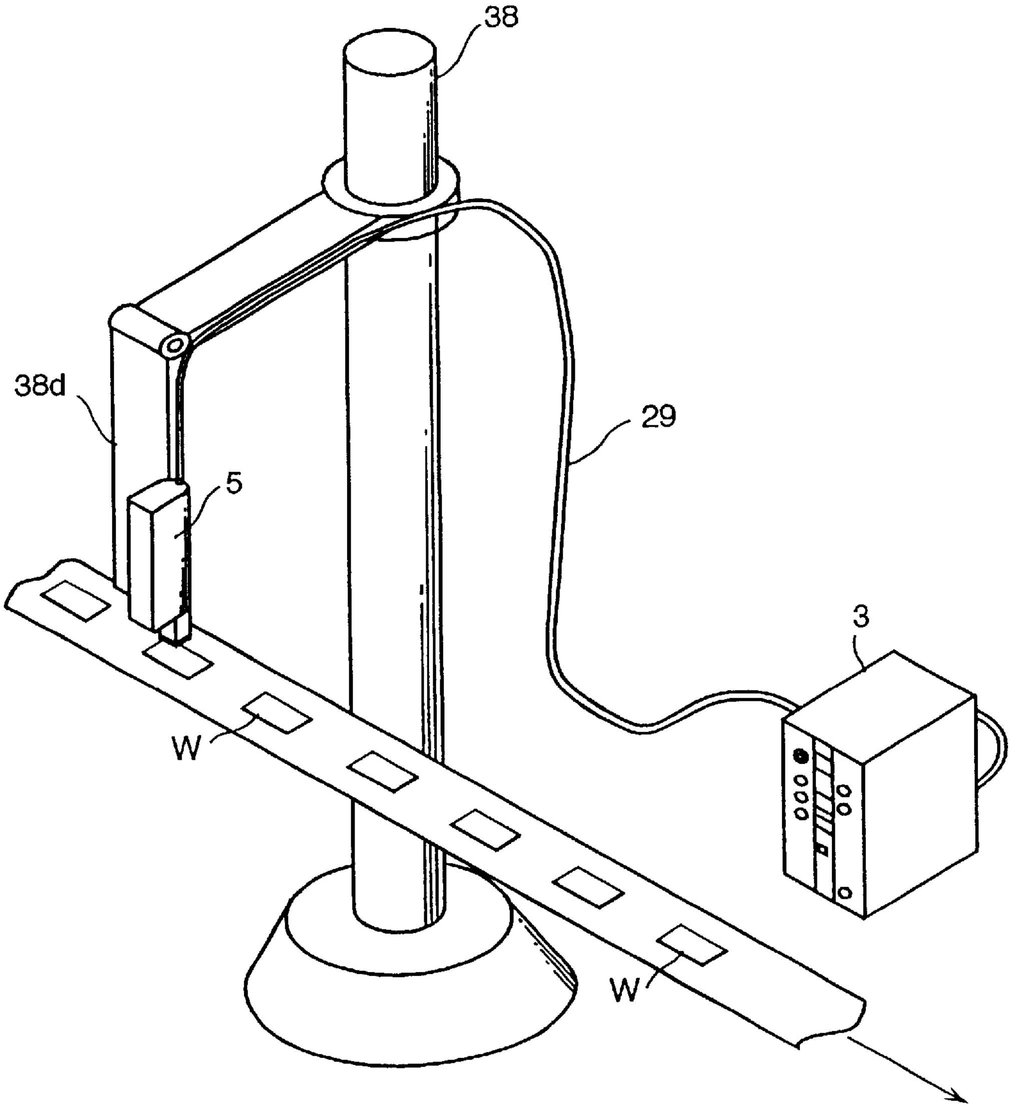
FIG. 40 is a perspective view showing an example of an application using the corona discharge apparatus to apply a plasma treatment where the discharge unit of the corona discharge apparatus is manipulated by a robot.

The high-voltage generating circuit 501 is built in the discharge unit 5 and generates a high voltage discharge at one end of the discharge unit 5. Thus, it is not necessary that the cable 29 be a type of high-tension cable. Accordingly, the cable 29 can be sufficiently flexible thereby permitting easy handling of the discharge unit 5. For example, as shown in FIG. 40, the discharge unit 5 is attached to an arm 38*d* of a manipulator robot 38. The robot arm 38 can then be freely moved without any restraint because of the flexibility and follow-up action of the cable 29. Further, even if the cable 29 becomes broken, it is safer than high-tension cables. Also, this configuration where both the cable 29 and the gas guide tube 31 are detachable from the control unit 3 and the discharge unit 5 makes installation of the corona discharge apparatus 1 in a factory quite easy. This is because the cable 29 and the gas guide tube 31 can be made to have lengths meeting the installation conditions.

In a typical application of the corona discharge apparatus, air is fed by the air pump 9 into the gas passage 23 of the discharge unit 5 via the gas guide tube 31 and is discharged from the discharge unit 5 through the gas outlet port 25. A control signal is fed to the built-in high-voltage generating circuit 501 from the control unit 3 via the cable 29 so as to control the voltage supply between the discharge electrodes 21. When a high discharge voltage is applied between the discharge electrodes 21 during operation of the corona discharge apparatus 1, a discharge arc is generated between the discharge electrodes 21. Then the discharge arc swells outwardly in arc shape by an air stream discharged through the gas port 25.

FIG. 4 schematically shows the corona discharge apparatus 1 and its various components. The control unit 3 comprises a CPU 301 and connected thereto is: a memory circuit 303, an oscillator control circuit 305, a switching circuit 307, an exciting or display circuit 309, an input/output circuit 313 and a pump drive circuit 315. The exciting or display circuit 309 is for exciting the display unit 11. The input/output circuit 313 is connected to a terminal arrangement 311 located on a rear wall of the housing 41 of the control unit 3. Further, the pump drive circuit 315 is for driving the air pump 9. The control unit 3 further comprises various feedback circuits, namely, a discharge current feedback circuit 317, an earth current feedback circuit 319 and a pressure feedback circuit 321. These feedback circuits 317, 319 and 321 actually function as an A/D converter. The terminal arrangement 311 is provided with a plurality of external input/output terminals including an input terminal for receiving a signal from a photoelectric switch (not shown) which detects when a work object has been transported into a plasma treatment station. The discharge unit 5 comprises at least a high-voltage generating circuit 501, a discharge current detection circuit 503, an earth current detection circuit 505, an over-current or excess current detection circuit 507, a temperature detection circuit 509 and a pressure detection circuit 511. These circuits of the control unit 3 and the discharge unit 5 are electrically connected through the cable 29. The temperature detection circuit 509 receives signals from a temperature sensor TS and the pressure detection circuit receives signals from the pressure sensor PS.

Figure 5:
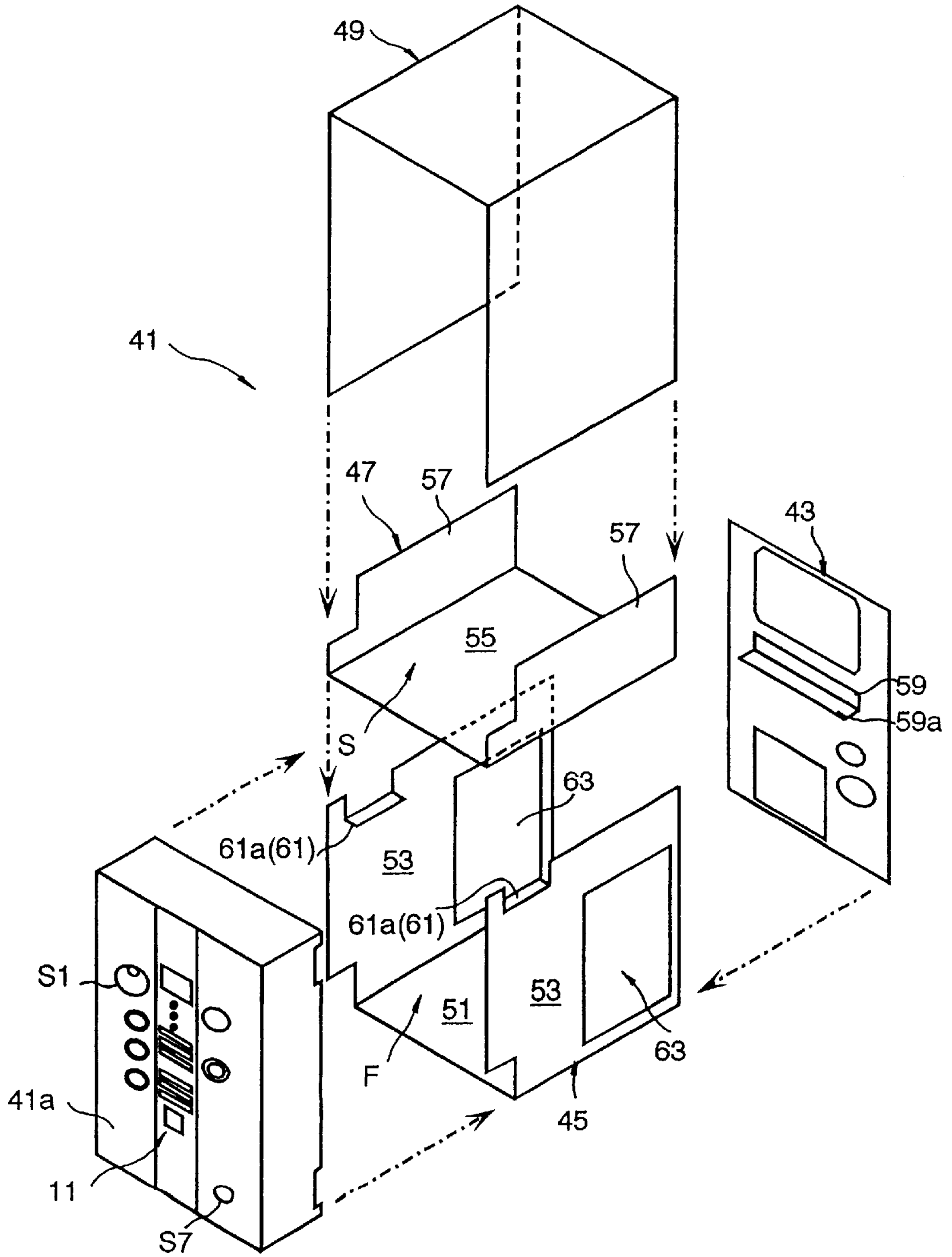
FIG. 5 is an exploded perspective view of a control unit housing shown in FIG. 1.

FIG. 5 shows the housing 41 of the control unit 3 in more detail. The housing 41 comprises a front panel or operating panel 41*a* and a rear panel 43 disposed some distance away located on the opposite side of the housing 41. The rear panel 43 is provided with an L-shaped channel member 59 extending transversely and secure thereto at a middle height of the rear panel 43. The L-shaped channel member 59 is disposed so as to form a horizontal support 59*a*. The housing further comprises lower frame 45, a middle frame 47 and an upper frame 49 put between the front and rear panels 41*a* and 43. These frames 45, 47 and 49 are disposed so as to form a double-decker compartment. Specifically, a lower compartment F is formed between the lower frame 45 and the middle frame 47 and an upper compartment S between the middle frame 47 and the upper frame 49. The lower frame 45 is configured in a generally U-shaped opening at the front and back by a rectangular bottom section 51 and opposite side sections 53 extending upwardly from the opposite side edges of the rectangular bottom section 51. Each side section 53 is formed with a side flange 61. The flange 61 is formed by partially bending an upper part of the side section 53 inwardly so as to form a horizontal support 61*a*. The side flange 61 is positioned to place the horizontal support 61*a* on the same planar level with the horizontal support 59*a* of the L-shaped flange member 59.

The middle frame 47 is configured in a generally thin U-shaped opening at the front and back by a rectangular bottom section 55 and opposite side sections 57 extending upwardly from the opposite sides of the rectangular bottom section 55. The middle frame 47 is supported on the horizontal supports 61*a* at its opposite sides and on the horizontal support 59*a* at its rear end. The upper frame 49 is configured in an inverted generally U-shaped opening at the front and back by a rectangular top section and opposite side sections extending downwardly from opposite side edges of the rectangular top section. The upper frame 49 covers the lower frame 45 and the middle frame 47. As shown in FIG. 5, the lower frame 45 is formed with an opening 63 for access to the interior mechanism at each of the side sections 53.

In assembling the housing 41 having the double-decker compartment, after the rear panel 43 is secured to the lower frame 53, the middle frame 47 is placed on the rear end support 59*a* of the L-shaped flange member 59 and the side supports 61*a* of the side flanges 61. Then it is fixed to the lower frame 45. The upper frame 49 is installed to cover the lower frame 45 and the middle frame 47 and is bolted at the locations where the respective side sections 53 and 57 of the lower frame 45 and the middle frame 47 overlap. Thereafter, the front operating panel 41*a* is attached and bolted to the upper frame 49. The rear panel 43 is bolted, or otherwise secured, to the rear end of the bottom section 51 of the lower frame 45. The housing 41 is easily disassembled for the purpose of alteration and/or replacement of internal parts. This is done by detaching in order, the operating panel 41*a*, the upper frame 49 and the middle frame 47 from the lower frame 45 and the rear panel 43, if necessary, after removing the bolts and/or screws.

FIGS. 6 through 9 show the internal arrangement of elements in the control unit 3. As clearly seen in FIG. 6, the lower frame 45 is provided with a pedestal 67 on the bottom section 51. The pedestal 67 is configured so as to support the air pump 9 thereon with some separation from the bottom section 51 of the lower frame 45. Buffer members 69 can be rubber members that are preferably placed between the air pump 9 and the pedestal 67. The top of the air pump 9 is secured to a bracket 71 that extends from and is bolted to the opposite side sections 53 of the lower frame 45. As clearly seen in FIG. 8, the bottom section 51 of the lower frame 45 is formed with a plurality of slots 73 for ventilation that are disposed below the pedestal 67.

Figure 9:
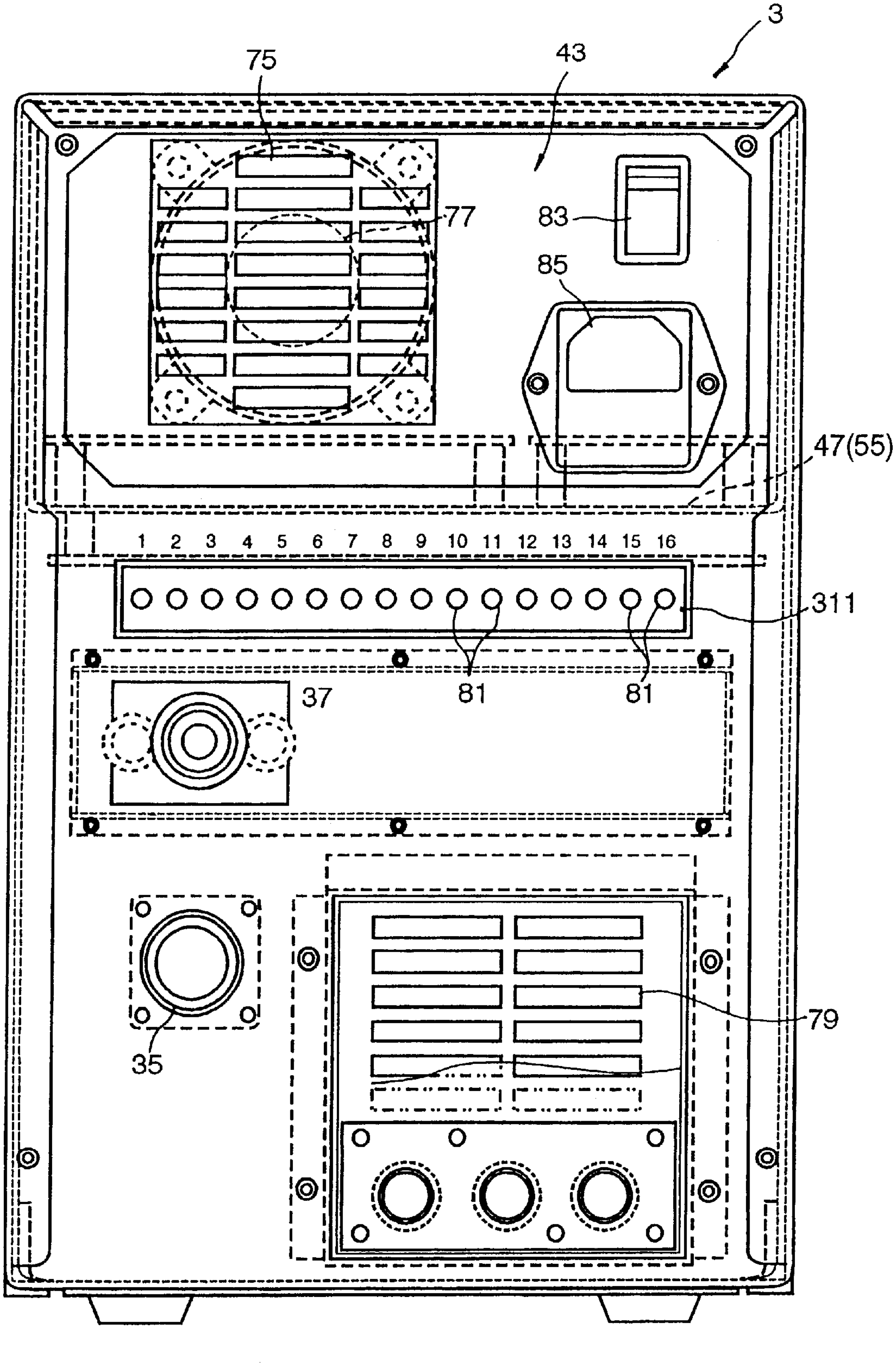
FIG. 9 is a rear view of the control unit partially broken away according to the present invention.

As shown in FIG. 9, an upper part of the rear panel 43 is provided with exhaust openings 75 behind an exhaust fan 77 that is disposed on the inside of the control unit 3. Further, a lower part of the rear panel 43 is provided with an air intake port 79 that is disposed on one side of the cable connector 35. These air intake ports 79 are covered by a filter (not shown). The terminal arrangement 311 has a horizontal row of 16 external input/output terminals 81 located approximately at the middle of the height of the rear panel 43. The tube connector 37 is an air inlet through which air is supplied by the air pump 9. The tube connector 37 is positioned between the terminal arrangement 311 and the cable connector 35. External equipment, such as a remote control device, can be connected to the terminals 81 so as to transfer signals between the control unit 3 and the external equipment. A main power switch 83 and a socket 85 through which electric power is supplied from a power source are positioned on one side of the exhaust openings 75.

Figure 6:
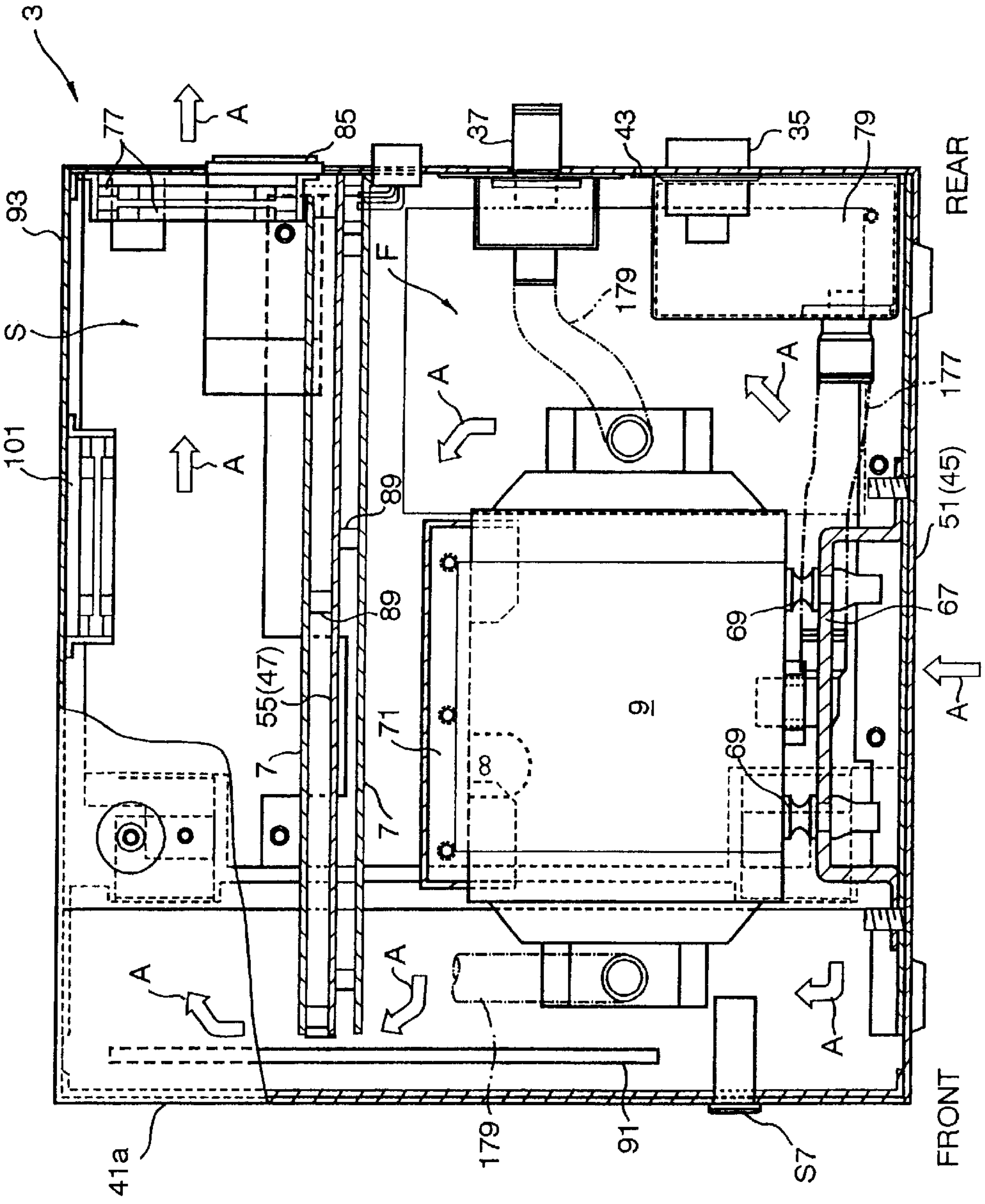
FIG. 6 is a cross sectional side view showing the interior of the control unit according to the present invention.
Figure 7:
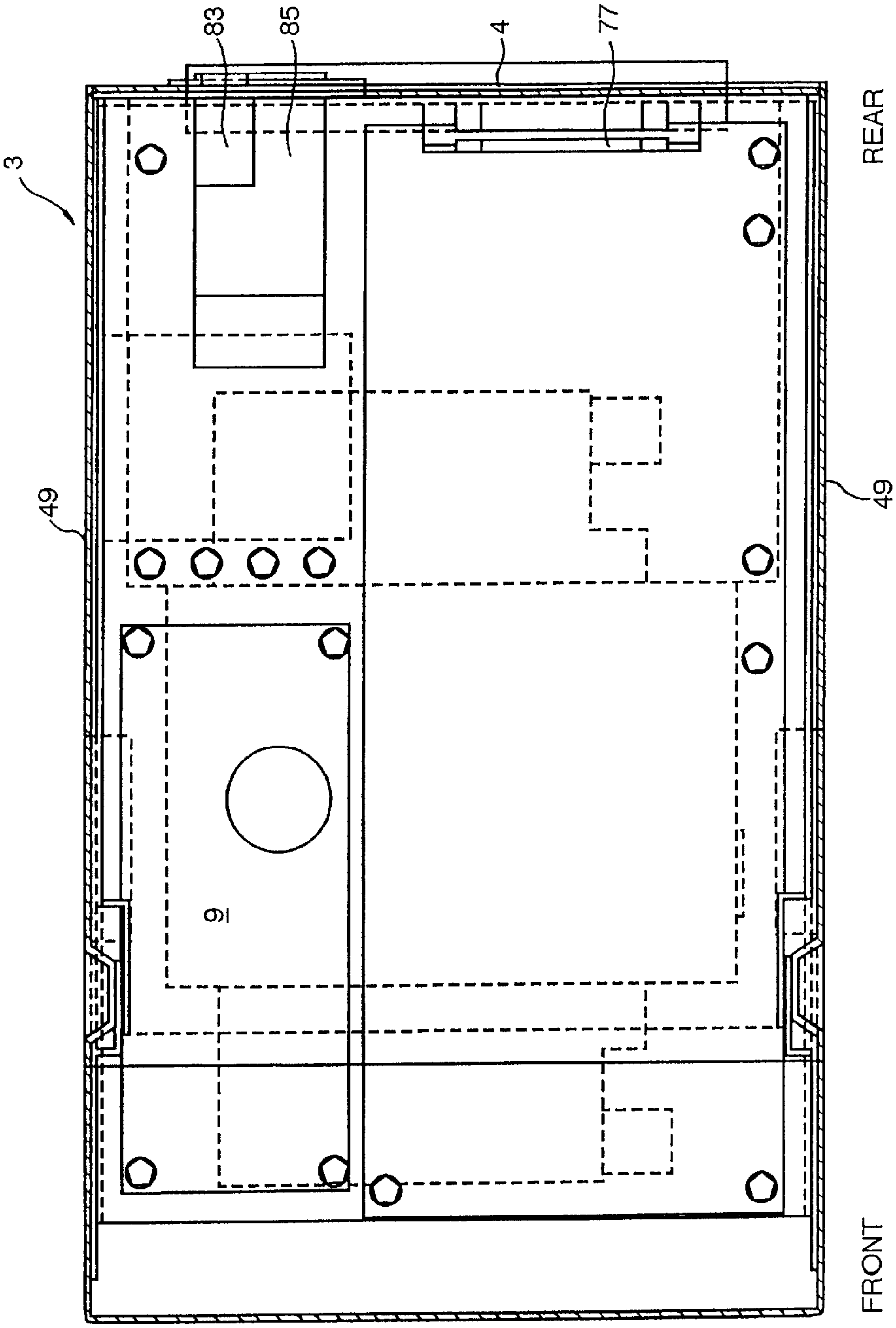
FIG. 7 is a cross sectional top view showing the interior of the control unit according to the present invention.
Figure 8:
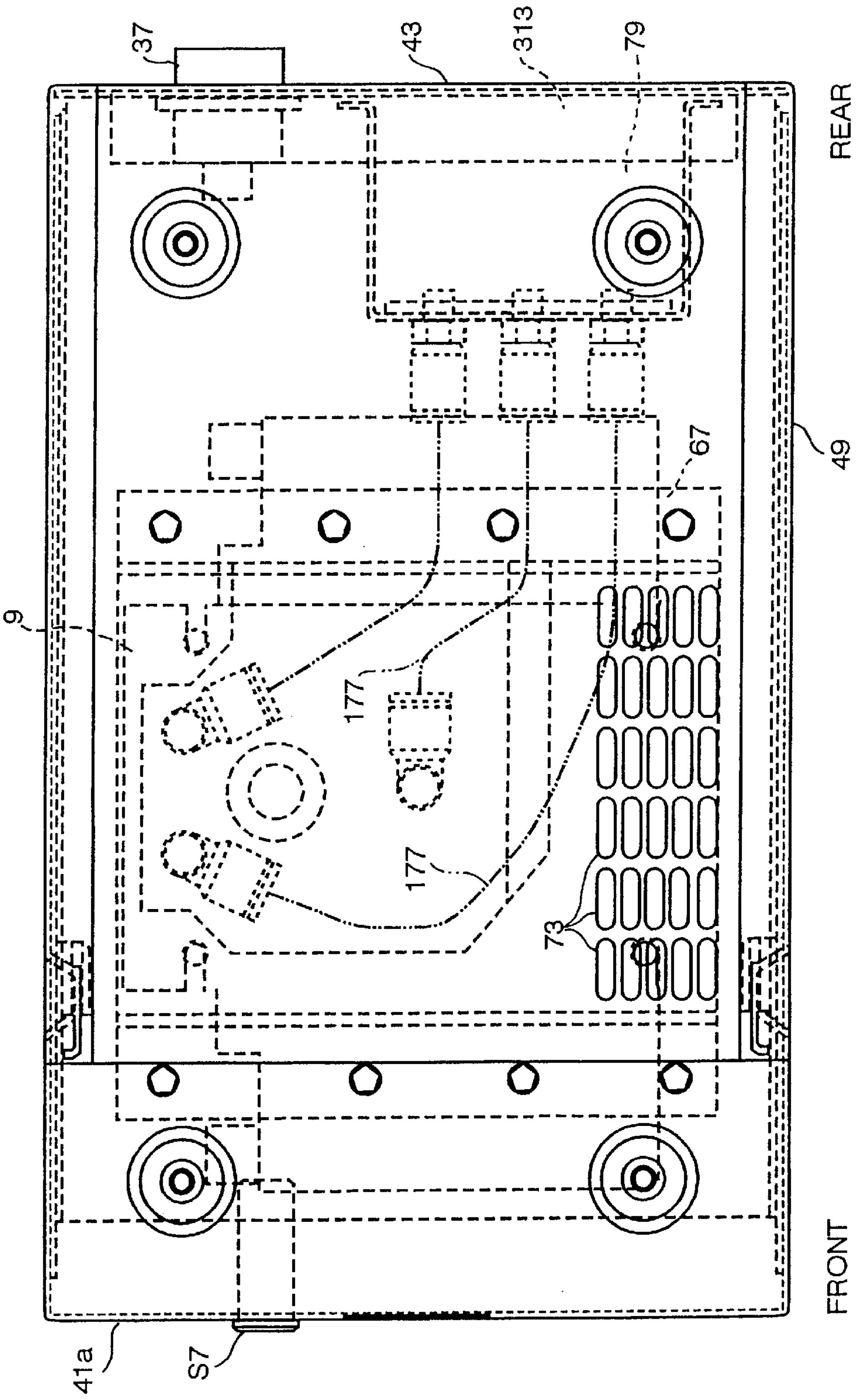
FIG. 8 is a bottom view showing the interior of the control unit according to the present invention.

The baseboards 7, namely an upper baseboard and a lower baseboard on which various circuit are arranged, are disposed on opposite sides of the base section 55 of the middle frame 47 and then secured to the middle frame 47. As shown in FIG. 6, the upper baseboard 7 is supported by stays 89 on the base section 55 of the middle frame 47. The lower baseboard 7 is supported by hanging stays 89 connected to the base section 55 of the middle frame 47. It is preferable to arrange the control circuits such as including a CPU, a ROM and a memory on the lower baseboard 7 and a main power circuit on the upper baseboard 7. The upper and lower baseboards 7 have their front ends positioned at a distance from a vertical baseboard 91 attached to the front operating panel 41*a* and rear ends positioned close to the rear panel 43. One side of the vertical baseboard 91 is provided with a display circuit for the display unit 11 and a switching circuit for the switches S1–S7.

The control unit 3 is provided with an internal cooling arrangement comprising the exhaust fan 77. When the exhaust fan 77 is actuated, fresh air enters the lower compartment F through the air vent vents 73 formed in the bottom section 51 of the lower frame 45. The air then flows along the front operating panel 41*a* and enter the upper compartment S. The air then flows rearwardly in the upper compartment S and is discharged out of the housing 41 of the control unit 3 by the exhaust fan 77. The airflow direction in the housing 41 is indicated by arrows A in FIG. 6. The air entering the lower compartment F passes by the air pump 9 to assist in removing heat from the air pump 9 by convection. Further, the air also passes along the lower baseboard 7 disposed below the bottom section 55 of the middle frame 47 to assist in removing heat from the electronic parts disposed on the lower baseboard 7. As the air moves from the lower compartment F to the upper compartment S, the air also assists in removing heat from the circuits of the display unit 11 and the switches S1–S7 on the vertical baseboard 91. Subsequently, the air enters the upper compartment S and moves rearwardly from the front to the back. Then, while the air is discharged out of the housing 41 by the exhaust fan 77, it also assists in removing heat from the electronic circuits and parts disposed on the upper baseboard 7 placed above the bottom section 55 of the middle frame 47. If the specific inside construction of the control unit 3 causes the air to partly accumulate in the upper compartment S, it is preferable to install a stirring fan 101 in a position, for example, near the top center of the upper compartment S as shown in FIG. 6.

Figure 10:
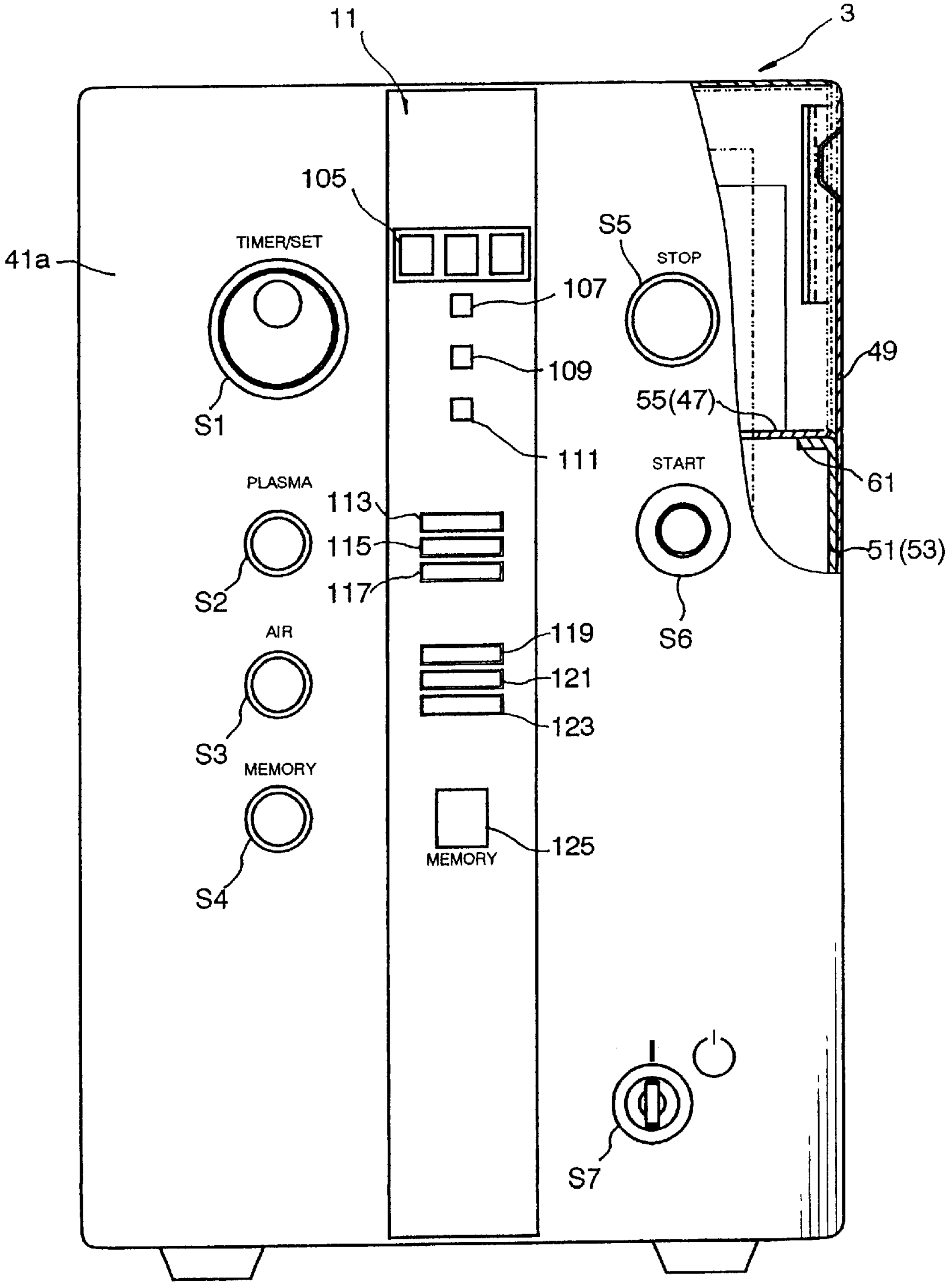
FIG. 10 is a front view of the control unit partially broken away according to the present invention.

FIG. 10 shows the front operating panel 41*a* of the housing of the control unit 3 in detail. The front operating panel 41*a* includes a timer switch S1. The timer switch S1 is of a push button type of dial switch. This timer switch S1 is operative to cause periodic alterations between a continuous operation mode and a timer operation mode when it is pushed in for a time longer than, for example, two seconds as will be described later. A power mode selection switch S2 is operative to select three available discharge modes as will be described later. Whenever the power mode selection switch S2 is pushed, the discharge mode is changed to another discharge mode. A gas source selection switch S3 is operative to select three available gas sources. Whenever the gas source selection switch S3 is pushed once it changes the gas source to another source.

The gas sources include:

(1) A built-in gas source which supplies air from the air pump 9 built in the control unit 3;

(2) An external fixed gas source which supplies air from an air pump installed in a factory or a working site. In this mode, the air pump 9 built in the control unit 3 is not operated. In the case the control unit 3 is designed to be available for the external fixed gas mode only, the control unit 3 is not provided with the air pump 9;

(3) An external gas source that supplies a gas such as Nitrogen from an external gas bottle. In this mode, the air pump 9 built in the control unit 3 is not operated.

A plasma treatment pattern alteration switch S4 is operative to alter a discharge among a plurality of, for example, seven preset plasma treatment patterns that are stored in the memory 303. A discharge stop switch S5 is operative to forcibly stop a discharge when it is pushed after a discharge starts. A start switch S6 is operative to start a discharge. A key switch S7 is operative to activate the corona discharge apparatus 1.

The display unit 11 includes a time indicator comprising light emitting diodes (LED time indicators) 105 for displaying a time in seconds with three digits. The display unit 11 further includes a vertical row of three indicator lamps 107, 109 and 111 that are located below the LED time indicator 105. A standby lamp 107 is turned on when the corona discharge apparatus 1 is ready for operation. A discharge lamp 109 is turned on while the corona discharge apparatus 1 is discharging. A remote control lamp 111 is turned on while the corona discharge apparatus 1 is being controlled remotely by, for example, a computer. There is another vertical row of three indicator lamps 113, 115 and 117 that are located below the row of three indicator lamps 107, 109 and 111. The indicator lamps 113, 115 and 117 indicate three available power modes that will be described later. A high power mode lamp 113 is turned on when a high power discharge mode is selected by the power mode selection switch S2. A low power mode lamp 117 is turned on when a low power discharge mode is selected by the power mode selection switch S2. A variable power mode lamp 117 is turned on when a variable power discharge mode is selected by the power mode selection switch S2. There is another vertical row of gas source indicator lamps 119, 121 and 123 that are located below the vertical row of mode indicator lamps 113, 115 and 117. The indicator lamps 119, 121 and 123 indicate the three available gas sources which are selected by the gas source selection switch S3 as was previously described. A built-in gas source lamp 119 is turned on when the built-in gas source is selected by the gas source selection switch S3. An external fixed gas source lamp 121 is turned on when an external fixed gas source (not shown) is selected by the gas source selection switch S3. An external gas source lamp 123 is turned on when an external gas source (not shown) is selected by the gas source selection switch S3.

The display unit 11 further includes a plasma treatment pattern indicator comprising a light emitting diode (LED plasma treatment pattern indicator) 125 located below the vertical row of gas source indicator lamps 119, 121 and 123. The LED plasma treatment pattern indicator 125 displays a single digit number indicative of a plasma treatment pattern selected by the plasma treatment pattern alteration switch S4. The single digit number (plasma treatment pattern code number) is incremented by one whenever the plasma treatment pattern alteration switch S4 is pushed once so as to change the plasma treatment pattern to another one. The plasma treatment pattern code number to be displayed can change between "1" to "7" if the corona discharge apparatus 1 has seven available plasma treatment patterns.

FIGS. 11 through 16 show the internal arrangement of the discharge unit 5 in further detail. The unit housing 13 comprises a rectangular box shaped main housing section 13*a* and a rectangular box shaped head housing section 13*b* disposed at a front end of the main housing section 13*a*, see also FIG. 2. The head housing section 13*b* is the same width as the main housing section 13*a* but it is shorter in height than the main housing section 13*a*. This can be seen from the front of the unit housing 13. The head housing section 1*b* is aligned with the main housing section 13*a* along their lower edges as can be seen in FIG. 2. A discharge electrode assembly 131 includes a pair of discharge electrodes 21 and a gas outlet port 25. The discharge electrode assembly is detachably secured to the head housing section 13*b* by a plurality of bolts 134.

The discharge unit housing 13 has the head housing section 13*b* offset toward the bottom of the main housing section 13*a*. Thus, when a plurality of the discharge units 5 are transversely arranged side by side in order to apply plasma to a work object having a wide treatment surface area to which the plasma treatment is applied, their discharge electrode assemblies 131 are positioned far away from one another. This is done by positioning every other discharge unit upside down and is shown, for example, by the imaginary line in FIG. 2. This alternating position arrangement prevents the generation of an undesirable discharge between adjacent discharge units 5.

Figure 12:
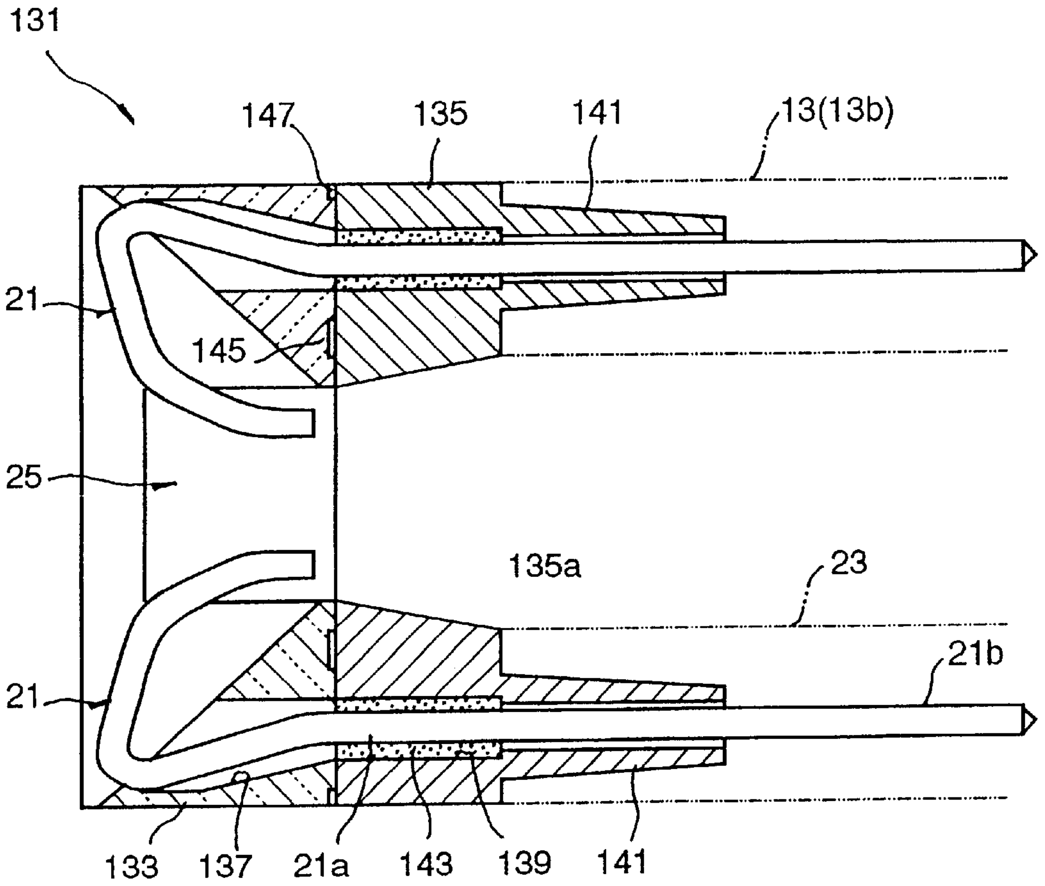
FIG. 12 is an enlarged cross sectional side view of a head section of the discharge unit housing for showing a discharge electrode assembly according to the present invention.

Referring to FIG. 12, the discharge electrode assembly 131 is shown in cross section. The discharge electrode assembly 131 comprises at least two discharge electrodes 21, a face plate 133 formed with an opening for the gas outlet port 25, and a pair of electrode supports 135 for the discharge electrodes 21. The discharge electrodes 21 are secured to the head housing section **13*b* by the respective electrode supports 135. The face plate 133 can be made of an electrical insulating and heat resistant ceramic such as alumina. The electrode support 135 can be made of an electrical insulating polyphenylene sulfide (PPS) resin. Since the PPS resin is chemically resistant as well as heat resistant, the electrode supports 135** are resistant to nitric acid that may be produced during plasma treating through a chemical reaction of water with NOx.

The face plate 133 is formed with respective bores 137 having substantially circular cross sections for receiving the discharge electrodes 21. Similarly, the electrode support 135 is formed with bores 139 having substantially circular cross sections for receiving the discharge electrodes 21. The electrode support 135 is further provided with a tapered stem 141 formed in a tapered pipe and extends from an end **135*a* of the electrode support 135. The electrode support 135 and the tapered stem 141 are formed as an integral piece and are formed with the bores 139 passing through them. An adhesion agent 143, such as a heat-resistant silicone resin bond and/or a heat-resistant epoxy resin bond, fills in the space between a section 21*a* of the discharge electrode 21 and the electrode support 135 in the bores 139 to firmly hold the discharge electrode 21 in the electrode support 135. The face plate 133 and the electrode supports 135 are also firmly fixed to each other by an adhesion agent 145. The adhesion agent 145 may be made of a heat-resistant silicone resin and/or a heat-resistant epoxy resin. On the side of the face plate 133 facing the electrode support 135, it is preferable to have circular recesses 147 which can be filled with the adhesion agent 145**.

The discharge electrode assembly 131 is secured to the head housing section **13*b* by means of the bolts 134. Tapered bores (not shown) are formed in the front of the head housing section 13*b* that correspond to the tapered stems 141 of the electrode supports 135 for snugly receiving the respective tapered stems 141. The tapered bores function as positioning guides when attaching the discharge electrode assembly 131 to the head housing section 13*b*. This makes assembly of the discharge electrode assembly 131 with the head housing section 13*b* quite easy. A rear end sections 21*b* of the discharge electrodes 21 that extend rearwardly beyond the electrode supports 135 are plugged into a socket (not shown) disposed in the head housing section 13*a*. A high discharge voltage is applied to the discharge electrode 21 through the socket. If the discharge electrode 21 becomes worn down or the hear-resisting face plate 133 becomes soiled, a current leak can possibly occur at the soiled parts or the worn down parts. The current leak causes a drop in the strength of the discharge arc. When the expected effect of the plasma treatment disappears, the discharge electrode assembly 131** can be removed and replaced with one that has been prepared.

The configuration of the discharge electrode assembly 131 has the discharge electrodes 21 supported by the electrode supports 135. The electrode supports 135 are separated from the tip ends of the discharge electrodes 21. The discharge electrodes are not supported by the heat-resistant ceramic face plate 133. This enables the discharge electrode assembly 131 to employ a heat-resistance resin bond as the adhesion agent 143 for firmly holding the discharge electrodes 21 in the electrode supports 135. If holding the discharge electrodes 21 are to be supported by the heat-resistant ceramic face plate 133, it is impossible at the present time to employ a heat-resistant resin bond for fixing the discharge electrodes 21 to the heat-resistant ceramic face plate 133. This is because the tip ends of the discharge electrodes 21 are heated to approximately several hundred degrees centigrade while they are discharging. Therefore, in order to firmly secure the discharge electrodes 21 and the heat-resistant ceramic face plate 133, use of a molten glass having a thermal expansion coefficient between those of the discharge electrodes 21 and the heat-resistant ceramic face plate 133 is acceptable. However, in generally large-scale facilities such as a glass-melting furnace it is essential to install a device with molten glass disposed in a space between the discharge electrodes 21 and the heat-resistant ceramic face plate 133.

The discharge electrode assembly 131 employs a isolating construction where the discharge electrodes 21 are held by the electrode supports 135 at a position located far from the tip ends of the discharge electrodes 21. This position is where the heating temperature of that portion **21*a* of the discharge electrodes 21 is relatively cooler than the temperature at the tip ends of the discharge electrodes 21. This allows resin bonds to be employed in the construction that are easy and convenient to handle. In addition, the electrode support 135 can be made of an electrical insulating heat-resistant resin such as a PPS resin that is less expensive than previous supports. These effects are especially significant in the discharge unit 5 of the corona discharge apparatus 1 of the present embodiment. Also, during discharging, the heat-resistant ceramic face plate 133 and the electrode supports 135 are cooled by an air stream flowing in the gas passage 23 so the portions 21*a* of the discharge electrodes 21 disposed in the electrode supports 135 are kept at a temperature significantly less than the tip ends of the discharge electrodes 21**.

Figure 11:
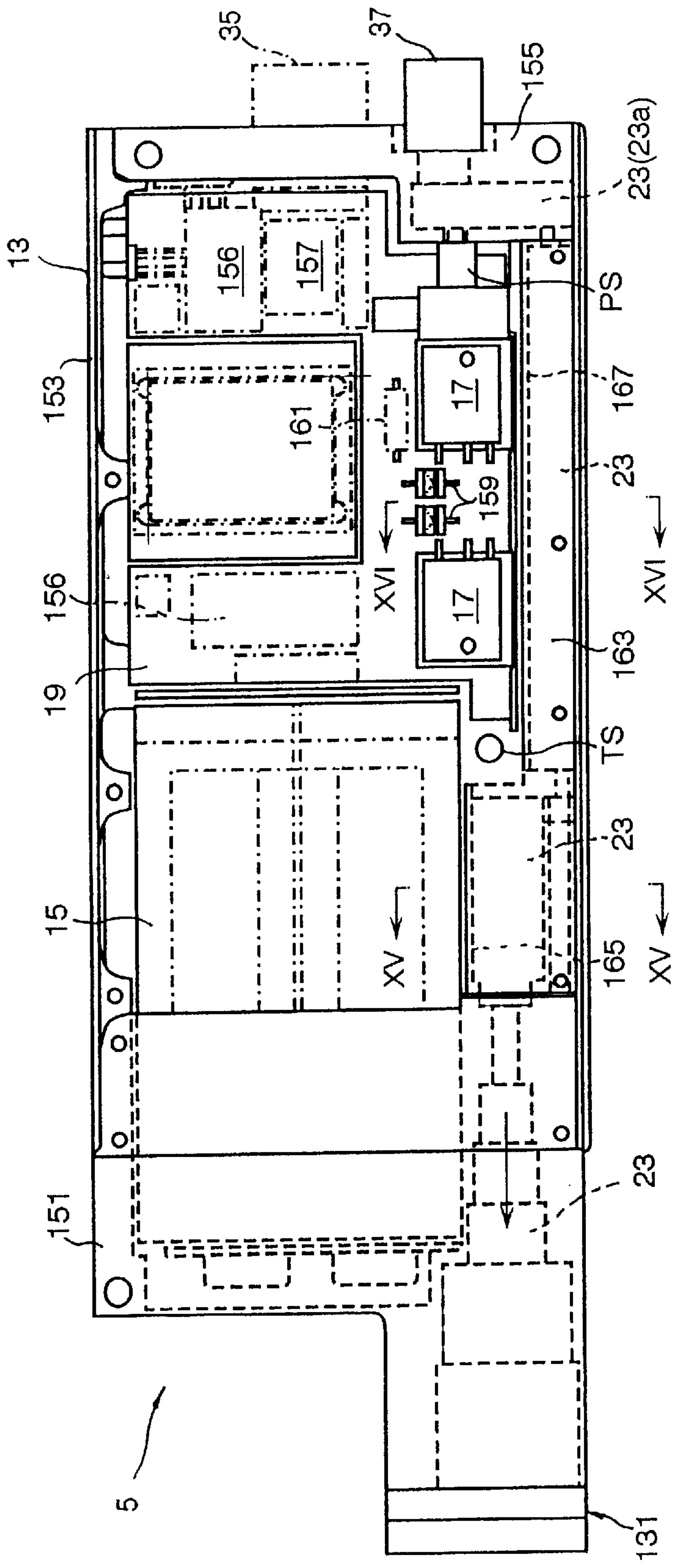
FIG. 11 is a side view of the discharge unit with a side panel removed according to the present invention.

FIGS. 11 and 13 through 16 show an internal cooling arrangement in the discharge unit 5. In FIG. 11 the discharge unit housing 13 is shown with a side cover removed. The unit housing 13 comprises a PPS resin molded component forming the front housing section 151, a generally U-shaped metal molded component forming a rear housing section 153 and a PPS resin molded component forming a rear end cover 155. The front housing section 151 is formed with a box-shaped chamber **151*a* opening on one side. The high-frequency step-up transformer 15 is received in the chamber 151*a*. The baseboard 19 is installed in the inside of the rear housing section 153. The high-voltage generating circuit 501 is arranged on the baseboard 19. The high-voltage generating circuit 501 includes an oscillation circuit and various electric parts, such as a condenser 156, a noise filter 157, a diode 159, a resistance 161, etc. associated to the high-voltage generating circuit 501**.

Figure 13:
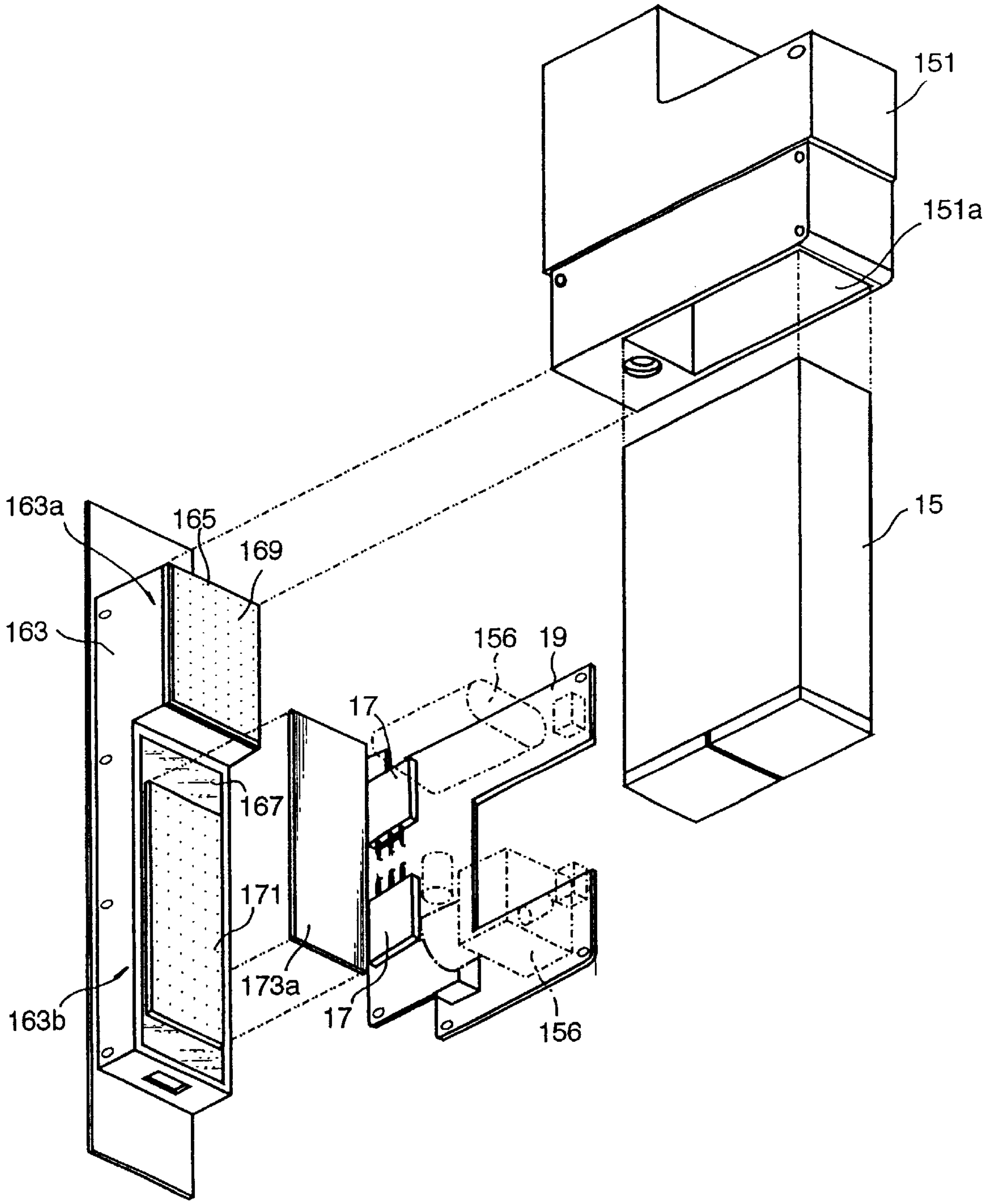
FIG. 13 is an exploded perspective view showing components forming a gas flow path as well as electric elements of the discharge unit according to the present invention.

The switching elements 17 mounted on the baseboard 19 are situated adjacent to the gas passage 23. The rear housing section 153 is provided with a long and thin plastic molded component 163 forming a part of the gas passage 23 extending along the side thereof The partial gas passage component 163 is configured to have a square cross section as shown in FIG. 13. The partial gas passage component 163 also has a sidewall 163*a* adjacent to the high-frequency step-up transformer 15 and a sidewall 163*b* adjacent to the switching elements 17. The sidewall 163*a* is formed with a large opening covered by a heat conductive plate 165. Similarly, the sidewall 163*b* is formed with a large opening covered by a heat conductive plate 167. The sidewalls 163*a* and 163*b* are partially made of a hard, heat conductive metal such as aluminum. While the heat conductive plates 165 and 167, such as aluminum plates, can also be employed for the sidewalls 163*a* and 163*b* adjacent to the high-frequency step-up transformer 15 and the switching elements 17, it is also possible to use another type of metal plate such as a brass plate and a copper plate, or even a resin plate containing ceramic particles, mica particles, ceramic powder or mica powder.

Figure 15:
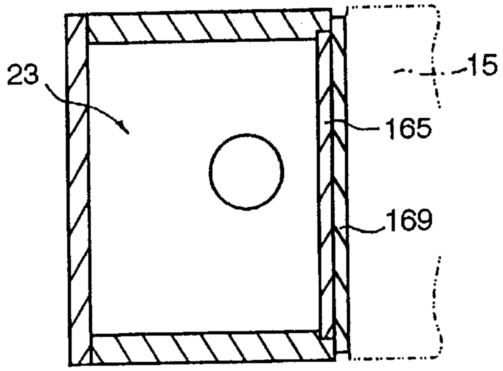
FIG. 15 is a cross sectional view taken along line XV—XV of FIG 11.
Figure 16:
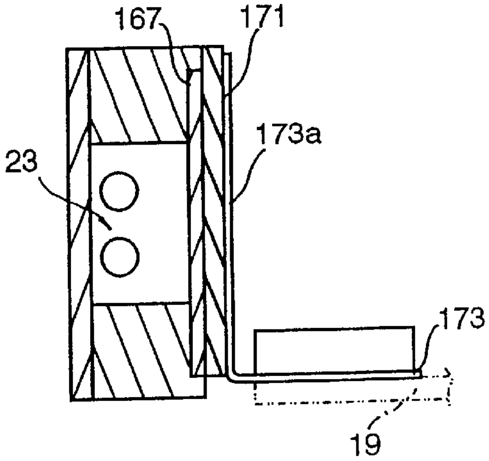
FIG. 16 is a cross sectional view taken along line XVI—XVI of FIG. 11.

The heat conductive aluminum plates 165, 167 are provided with a soft heat conductive sheet 169, 171 as shown in FIGS. 15 and 16. In this embodiment, a silicone resin sheet can be used for the soft heat conductive sheet 169, 171. However, the silicone resin sheet may be replaced with an epoxy resin sheet, a rubber sheet, a ceramic plate, a mica plate or an adhesive resin sheet containing epoxy resin particles, rubber particles, ceramic particles or mica particles. Further grease (adhesive oil) containing particles of a heat conductive material may be applied over the heat conductive aluminum plate 165, 167. The silicon resin sheet 169, which is attached to the heat conductive aluminum plate 165 forming part of the sidewall of the partial gas passage component 163, fills up a gap between the heat conductive aluminum plate 165 and the high-frequency step-up transformer 15 as seen in FIG. 15. This forms a direct heat transmission path from the high-frequency step-up transformer 15 to the gas passage 23 through the heat conductive aluminum plate 165. Accordingly, the heat from the high-frequency step-up transformer 15 is partially transmitted to the gas passage 23 through the silicone resin sheet 169 and the heat conductive aluminum plate 165 so it can be exchanged into the gas stream in the gas passage 23. In this way, the gas stream in the gas passage 23 helps to cool the high-frequency step-up transformer 15.

Figure 14:
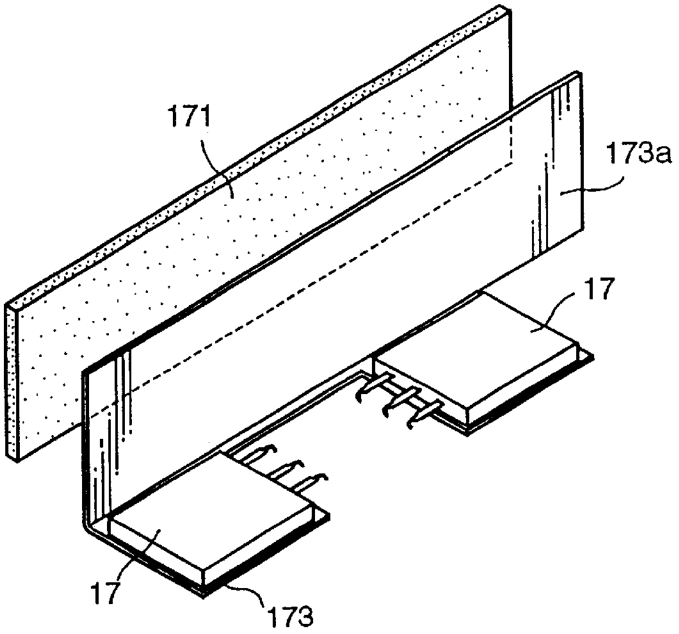
FIG. 14 is a perspective view showing a heat radiation path configuration between a gas passage and switching elements of the discharge unit according to the present invention.

The switching elements 17 are mounted on the baseboard 19 through a generally L-shaped radiator plate 173 as shown in FIG. 14. The radiator plate 173 has an upright radiator fin 173*a* that is positioned adjacent to the heat conductive aluminum plate 167 forming part of the sidewall of the partial gas passage component 163. The silicon resin sheet 171, which is attached to the heat conductive aluminum plate 167 forming part of the sidewall of the partial gas passage component 163, fills up a gap between the heat conductive aluminum plate 165 and the upright radiator fin 173*a* of the radiator plate 173 as shown in FIG. 16. This construction forms a direct heat transmission path from the switching elements 17 to the gas passage 23 through the radiator plate 173, the upright radiator fin 173*a*, the silicon resin sheet 171 and the heat conductive aluminum plate 167. Accordingly, the heat from the switching elements 17 is partially transmitted to the gas passage 23 through the radiator plate 173, the silicone resin sheet 171 and the heat conductive aluminum plate 165 so that it can then be heat exchanged with the gas stream in the gas passage 23. In this way, the switching elements 17 are cooled by the gas stream in the gas passage 23. In this embodiment, although the high-frequency step-up transformer 15 is sensitive to heat since it is installed or mounted to the discharge unit 5 that receives heat directly from the discharge electrodes 21, the internal cooling arrangement effectively prevents the inside of the discharge unit 5 from experiencing an extraordinary raise in temperature. This is true even when a miniaturized discharge unit housing is used. As a result, the high-frequency step-up transformer 15 is prevented from experiencing heat-deterioration.

The corona discharge apparatus 1 is equipped with an airflow control system. Fresh air is introduced through the air intake port 79 and then it is filtered. The air is supplied to the air pump 9 through three air ducts 177 that are detachably connected as shown schematically in FIG. 8. The air pump 9 discharges pressurized air and feeds it to the connectors 37 through two air ducts 179. One of the air ducts 179 is detachably connected to and extends from the front of the air pump 9. Another one of the air ducts 179 is detachably connected to and extends from the back of the air pump 9.

As shown in FIGS. 3, 4 and 11, the gas passage 23 disposed within the discharge unit housing 13 is provided with a gas chamber 23*a* at an upstream end thereof A gas flow sensor PS is disposed in the discharge unit housing 13 to detect the flow rate of the gas in the gas chamber 23*a* and provides a signal indicative thereof The signal is sent to a pressure detection circuit 511 in the discharge unit housing 13. The pressure detection circuit 511 is operative to detect a pressure P of the gas stream on the basis of the signal representative of the flow rate of the gas. The pressure detection circuit 511 then sends a control signal to an airflow rate feedback control circuit 321 disposed in the control unit 3.

The airflow rate feedback control circuit 321 compares the pressure P with a target pressure Po that is substantially representative of a standard flow rate of a gas. When the pressure P is lower than the target pressure Po, this indicates that the airflow rate is insufficient. In this case, the airflow rate feedback control circuit 321 controls the air pump 9 to increase the amount of discharged air. On the other hand, when the pressure P is higher than the target pressure Po, this indicates that an excess amount of air is being supplied. In this case, the airflow rate feedback control circuit 321 controls the air pump 9 to reduce the amount of discharged air. The discharge unit 5 discharges air at a constant flow rate through the airflow rate feedback control. As described above, although the control unit 3 and the discharge unit 5 are connected by the detachable gas guide tube 31, a constant flow rate of air can be guaranteed to be discharged from the discharge unit 5 due to the airflow rate feedback control. This is true even if different lengths of gas guide tubes are used. When supplying gas from an external gas source, a flow rate control valve can be disposed in the gas guide tube 31 and controlled by means of the control unit 3. In connection with the airflow rate feedback control, if a failure in the connection occurs such as a gas leakage, clogging or breakage of the gas guide tube 31, or if the $N_2$ gas bottle is emptied, a lower limit of the standard pressure PL may be adopted as a safety measure. This causes the control unit 3 to interrupt the discharge and concurrently turn on a warning lamp (not shown) when the detected pressure P drops below the lower limit of the standard pressure PL.

Figure 17A:
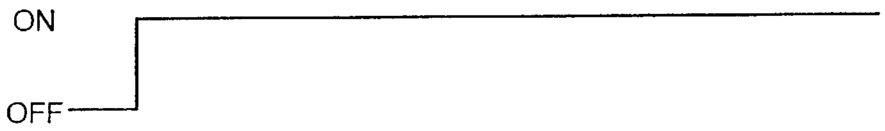
FIG. 17A is a diagram showing a voltage waveform applied to the discharge electrodes in a continuous high power discharge mode according to the present invention.
Figure 17B:
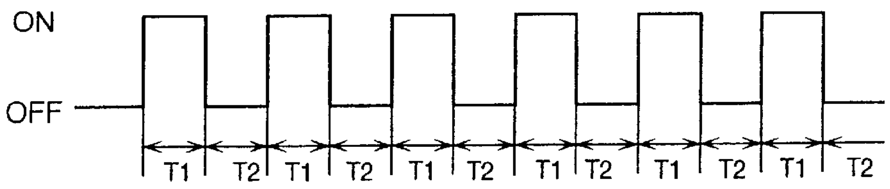
FIG. 17B is a diagram showing a voltage waveform applied to the discharge electrodes in an intermittent low power discharge mode according to the present invention.
Figure 17C:
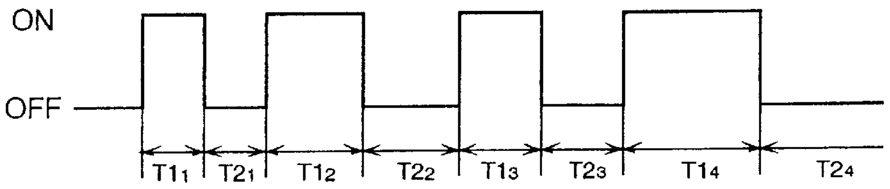
FIG. 17C is a diagram showing a voltage waveform applied to the discharge electrodes in a variable power discharge mode according to the present invention.

Referring to FIGS. 17A through 17C, the corona discharge apparatus 1 has three discharge modes. These three discharge modes are a high power discharge mode, a low power discharge mode and a variable power discharge mode, that are selected by the power mode selection switch S2. As shown in FIG. 17A, the high power discharge mode provides a continuous discharge with a high duty ratio (oscillation frequency) of, for example, 50% to 100%. As shown in FIG. 17B, the low power discharge mode provides a regular intermittent discharge at a constant frequency with a lower duty ratio of less than 50%. As shown in FIG. 17C, the variable power discharge mode provides a variable intermittent discharge with a variable duty ratio.

In the high power discharge mode and the low power discharge mode, the amount of energy of the discharge per unit time is constant. However, the continuous discharge in the high power discharge mode provides a higher discharge energy level than the intermittent discharge in the low power discharge mode. Specifically, in the low power discharge mode, the discharge duty ratio is 50%. In other words, the discharge duration time T1 and the discharge interval time T2 are the same, for example, 8 ms. In the low power discharge mode, the discharge duty ratio is, for example, 25%. That is, a discharge duration time T1 is 8 ms, and a discharge interval T2 is 24 ms. In the variable power discharge mode, the discharge energy per unit time is varied with time. As shown in FIG. 17C, the discharge duty ratio is 50%. A discharge duration time T1, which is equal to a discharge interval T2, is irregularly varied so, for example, $T1_1$, $(T2_1)$=5 ms, $T1_2(T2_2)$=7 ms, $T1_3(T2_3)$=6, $T1_4(T2_4)$=8 ms, etc. with time. The discharge duration time T1, and hence discharge interval T2, are changed by varying the discharge frequency and/or the duty ratio. Also, in the variable power discharge mode, the discharge duration time T1 and the discharge interval T2 may be varied with time, together or independently of each other.

In the high power discharge mode and the low power discharge mode, the discharge energy may be regulated not by varying the duty ratio but by varying the voltage applied to each of the discharge electrodes 21. The voltage applied to each of the discharge electrodes 21 can be the same or different. That is to say, the applied voltage is higher in the high power discharge mode than in the low power discharge mode or lower in the low power discharge mode than in the high power discharge mode. Accordingly, the high power discharge mode has a relatively higher discharge energy and provides a relatively larger plasma than the low power discharge mode. Conversely, the low power discharge mode has a relatively lower discharge energy and provides a relatively smaller plasma than the high power discharge mode. The three available discharge modes can be selectively used according to the kind of work object and/or the type of treatment to be applied. For example, the high power discharge mode is suitable for work object s that are hard to treat and other general work object s made of resin. The low power discharge mode is suitable for heat sensitive work object s such as thin plastic films or sheets.

On the other hand, the variable discharge mode is suitable for conductive work object s such as metal products. In this sense, the variable power discharge mode can also be called a "conductive work treating mode". Conductive work object s like those made of metal are apt to cause a discharge between the work object and the discharge electrodes 21 of the discharge unit 5. When applying the plasma treatment in the high power discharge mode or the low power discharge mode to the conductive work object, a path of discharge between the conductive work object and the discharge electrodes 21 is fixed. Thus the plasma treatment is effective locally on the work object. This causes a problem as to how to limit the effective range of the plasma treatment to a small treatment surface area of the work object. The problem is especially significant in the case where the conductive work object remains stopped in position for the plasma treatment.

In order to avoid this problem one may consider applying the plasma treatment to a moving work object, but this is impractical. For example, in the case where a pulse voltage is applied between the discharge electrodes 21 for plasma treatment of the conductive work object, plasma grows in a direction toward the work object. Then when subsequently applying a pulse voltage, since the work that has been kept locally ionized at its surface by plasma hanging around, the ionized work surface has a tendency to easily generate a discharge. Thereafter, the ionized work surface immediately discharges without an accompanying growth of plasma. As a result, the path of the discharge is fixed. Applying a variable pulse voltage causes the path of discharge to intentionally shift, so that the plasma treatment is effective on the treatment surface area of the work object. Also, the variable power discharge mode is preferably used to apply the plasma treatment to a wide treatment surface area.

In the event that a discharge occurs between a work object and the discharge electrodes 21, the plasma treatment is effective in a limited local treatment surface area of the work object. While this local discharge occurs in treating metal works, it sometimes takes place when treating work object made of resin. Therefore, when an occurrence of local discharge is anticipated or inevitable such as when a selected discharge mode is improper or when an unexpected discharge occurs due to an atmosphere around the treating area, it is preferable to perform an automatic power mode altering control to use the variable power discharge mode.

Figure 18:
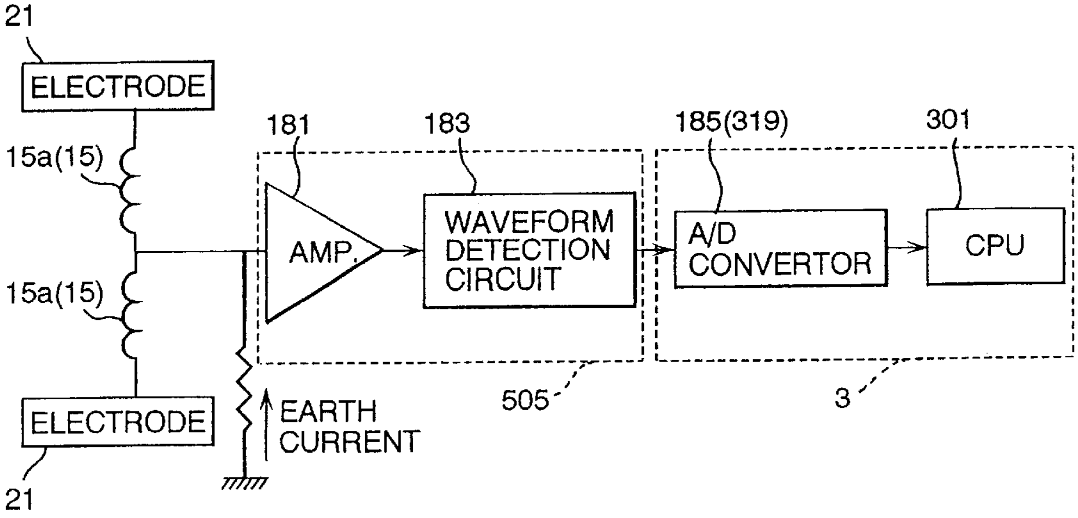
FIG. 18 is a schematic diagram showing an automatic discharge mode alteration control circuit according to the present invention.

FIG. 18 shows an automatic discharge mode alteration control circuit installed in the discharge unit 5 for triggering use of the variable power discharge mode. The automatic discharge mode alteration circuit comprises an earth current detection circuit 505 for detecting an earth current flowing between the discharge electrode 21 and the earth ground, i.e. a current that flows from a work object to the earth ground when a discharge is caused between the discharge electrodes 21 and the work object. The earth current detection circuit 505 includes an amplifier circuit 181 and a waveform detection circuit 183. The amplifier circuit 181 amplifies an earth current across a secondary coil 15*a* of the high-frequency step-up transformer 15 and the earth ground and then sends the amplified earth current to the waveform detection circuit 183. After detecting a waveform, an A/D conversion circuit 185 that is installed in the control unit 3 converts a current signal into a digital current signal. On the basis of the digital signal, the CPU 302 of the control unit 3 performs the automatic discharge mode alteration control.

Figure 19:
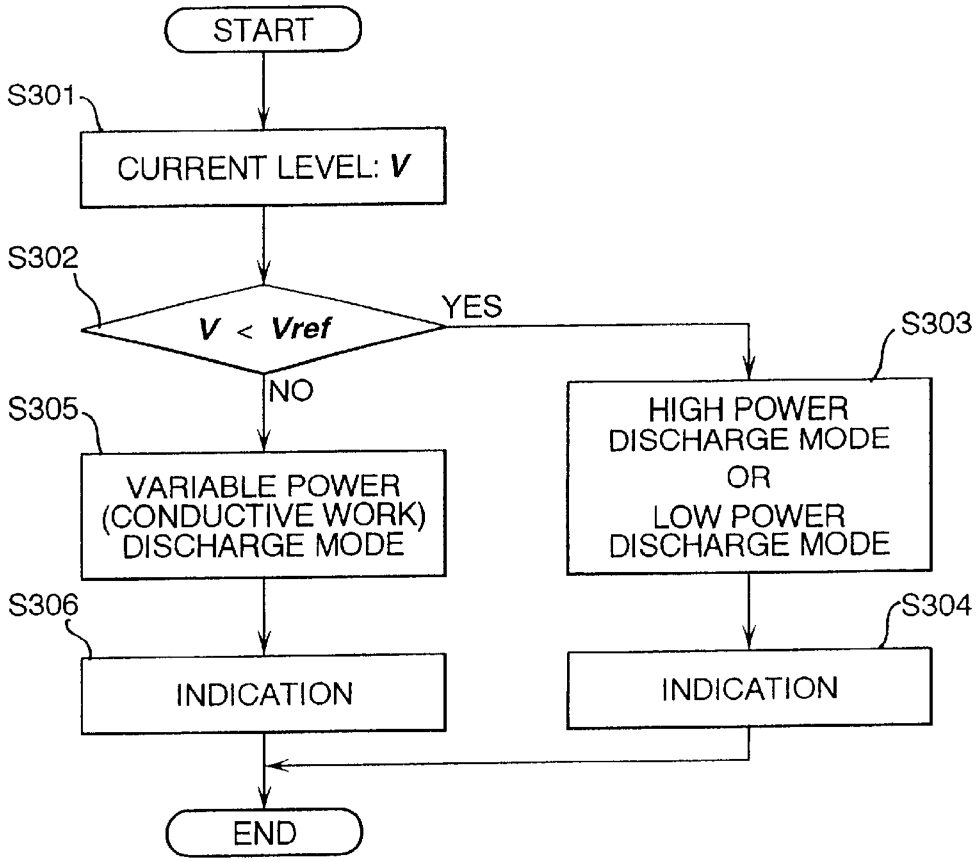
FIG. 19 is a flowchart illustrating a routine for controlling alterations of the automatic discharge mode according to the present invention.
Figure 20:
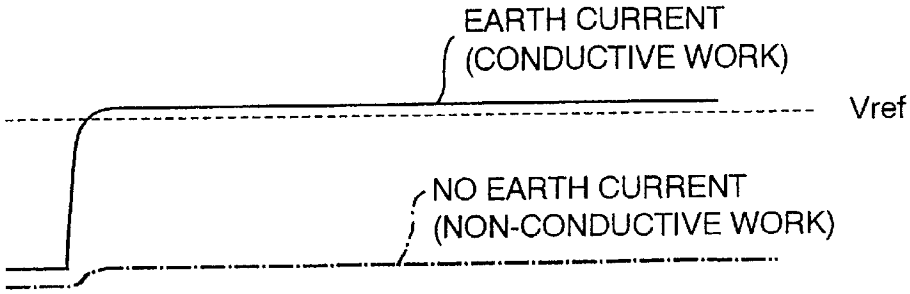
FIG. 20 is an explanatory diagram showing a threshold level that is used in controlling alterations of the automatic discharge mode according to the present invention.

FIG. 19 is a flowchart illustrating a sequence routine for automatic discharge mode alteration control in the CPU 301 of the control unit 5. The automatic discharge mode alteration control is performed when the power mode selection switch S2 selects either the high power discharge mode or the low power discharge mode. When the CPU 301 receives a digital current signal, representative of a level of current V from the A/D conversion circuit 185 in step S301, a comparison is made in step S302 to determine whether the current signal level V is lower than a threshold current level Vref. FIG. 20 shows a waveform of an earth current before A/D conversion. The threshold current level Vref is set between a current signal level that is obtained when an earth current is detected and a current signal level that is obtained when no earth current is detected.

As understood in FIG. 20, an earth current flows from a work object to the earth ground has a high level when a discharge occurs between the work object and the discharge electrodes 21. On the other hand, a current across the secondary coil 15*a* of the high-frequency step-up transformer 15 has a low level when a discharge occurs between the discharge electrodes 21. When the current signal level V is lower than the threshold current level Vref, this indicates that there is no discharge between the work and the discharge electrodes 21. Thus the selected discharge mode, namely the high power discharge mode or the low power discharge mode, can be maintained in step S303. The indicator lamp 113 or 115 for the selected discharge mode is also left on in step S304. On the other hand, when the current signal level V is equal to or higher than the threshold current level Vref, this indicates that there is a discharge between the work and the discharge electrodes 21. In this case, the variable power discharge mode is automatically called for and is switched on in step S305. Immediately thereafter, the indicator lamp 114 is turned on to provide a visual indication of the change to the variable power discharge mode in step S306.

Although the automatic discharge mode alteration control illustrated by the flow chart in FIG. 19 can change the conductive work treating mode from the high power discharge mode or the low power discharge mode (non-conductive work treating mode), the control can also be modified to perform an alteration to the non-conductive work treating mode from the conductive work treating mode when the work object is detected to be non-conductive. Further, the control can also be modified so as to perform an alteration to the high power discharge mode when the work object is detected to be thick or to the low power discharge mode when the work object is detected to be thin.

The corona discharge apparatus 1 is also provided with a safety and protection feature for preventing internal electronic components from accidental damage. The temperature detecting circuit 509 shown in FIG. 4 detects an internal temperature of the discharge unit 5 on the basis of a signal from a built-in temperature sensor TS. The temperature sensor TS is preferably disposed near the high-frequency step-up transformer 15. A temperature signal from the temperature detecting circuit 509 is transmitted to the CPU 301 of the control unit 3 through the cable 29. When the internal temperature of the discharge unit 5 is significantly low, the CPU 301 provides the high-voltage generating circuit 501 including the oscillation circuit with a shutdown signal for rendering it inactive so as to stop generation of the high voltage discharge. This prevents the discharge electrodes 21 from causing an accident such as short-circuiting in cold weather when frost forms on the discharge electrodes 21. Similarly, when the internal temperature of the discharge unit 5 is significantly high, the CPU 301 provides the high-voltage generating circuit 501 with a shutdown signal for rendering it inactive so as to stop generation of the high voltage discharge. This prevents deterioration of the high-frequency step-up transformer 15 and/or the built-in electronic parts due to heat in the discharge unit 5.

The safety control employs upper and lower thresholds, namely an upper temperature limit TH, for example, 80° C. and a lower temperature limit TL, for example, −10° C. The high-voltage generating circuit 501, and hence the oscillation circuit, are rendered inactive so as to stop generation of the high voltage discharge when the temperature sensor detects internal temperatures out of a range between the upper and lower limits temperatures TH and TL.

The safety and protection features further prevent the internal electronic components from being accidentally damaged when the discharge electrode assembly 131 is not attached to the discharge unit 5. In order to prevent the internal electronic components from being accidentally damaged after the start switch S6 is operated when the discharge electrode assembly 131 is not attached, the control unit 3 is adapted to render the high-voltage generating circuit 501, and hence the oscillation circuit, inactive by stopping the generation of a high voltage discharge or to forcibly turn off the main power switch 83 even though the start switch S6 has been operated.

Figure 21:
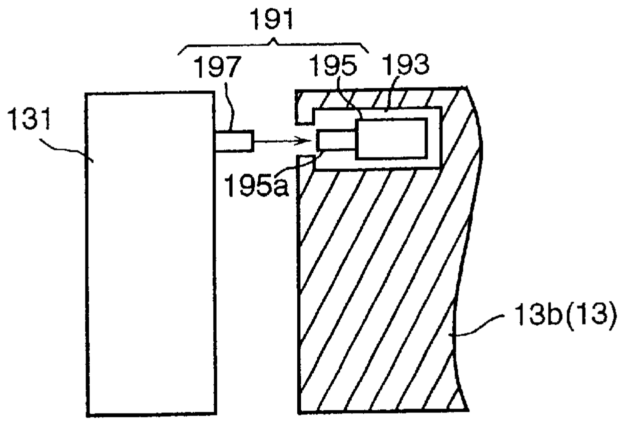
FIG. 21 is an explanatory view showing a discharge electrode assembly detection mechanism according to the present invention.

FIG. 21 shows one example of the discharge electrode assembly detection means 191 for detecting when the discharge electrode assembly 131 is attached to or disconnected from the discharge unit 5. The discharge electrode assembly detection means 191 comprises a pushbutton type switch 195 having a pushbutton 195*a* and an actuator pin 197 that can be installed to the respective head housing section 13*b* of the discharge unit housing 13 and the discharge electrode assembly 131, respectively, or vice versa. As shown in FIG. 21, the switch 195 is received in a small chamber 193 of the head housing section 13*b*. The actuator pin 197 extends from the back of the discharge electrode assembly 131. When the discharge electrode assembly 131 is properly mounted to the head housing section 13*b*, the actuator pin 197 enters the chamber 193 of the head housing section 13*b*. This pushes the pushbutton 195*a* to actuate the switch 195. When the discharge electrode assembly 131 is disconnected from the head housing section 13*b*, the actuator pin 197 is moved away from the pushbutton 195*a* and turns off the switch 195. While the switch 195 remains turned off, the control unit 3 renders the high-voltage generating circuit 501, and hence the oscillation circuit, inactive so as to prevent generation of a high voltage discharge or it forcibly turns off the main power switch 83. The discharge electrode assembly detection means 191 is suitable as a safety mechanism since the discharge electrode assembly detection means 191 is formed so that the switch 195 remains off until a somewhat stiff member is inserted into the chamber 197.

Figure 22:
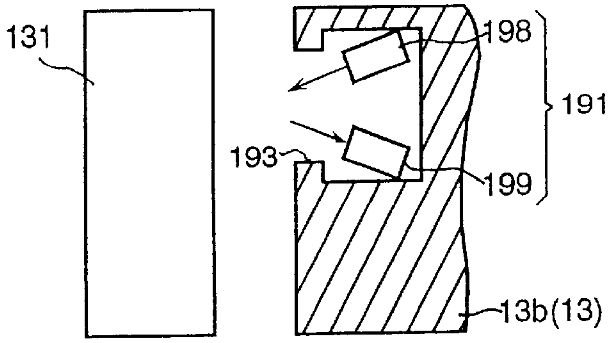
FIG. 22 is an explanatory view showing another discharge electrode assembly detection mechanism according to the present invention.

The discharge electrode assembly detection means 191 may comprise photoelectric elements. As shown in FIG. 22, a light emitting element 198 and a photoelectric element 199 are installed into the chamber 193 of the discharge unit housing 13. The light emitting element 198 and a photoelectric element 199 are arranged so that when the discharge electrode assembly 131 is properly mounted to the head housing section 13*b*, light produced by the light emitting element 198 is reflected back by the rear surface of the discharge electrode assembly 131 and received by the photoelectric element 199. Unless the photoelectric element 199 continues to receive reflected light and provides a signal of the reflected light, the control unit 3 renders the high-voltage generating circuit 501, and hence the oscillation circuit, inactive so as to prevent generation of a high voltage discharge or it forcibly turns off the main power switch 83.

Figure 23:
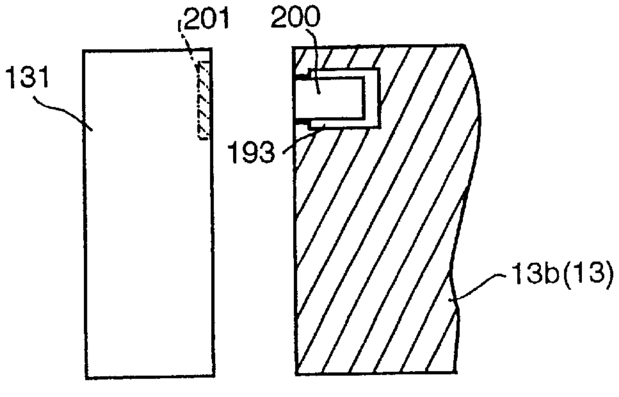
FIG. 23 is an explanatory view showing still another discharge electrode assembly detection mechanism according to the present invention.

The discharge electrode assembly detection means 191 may also comprise a proximity sensor or a proximity switch 200 as shown in FIG. 23. The proximity sensor and the proximity switch are known in various forms in the art. Any well-known form of proximity sensor or proximity switch may be employed. The proximity sensor and the proximity switch 200 may also be replaced with a magnetic sensor. In this case, the rear side of the discharge electrode assembly 131 is provided with a metal element 201 that can be detected by the magnetic sensor when the discharge electrode assembly 131 is properly mounted to the head housing section 13*b*. It is also acceptable to form the discharge electrode assembly detection means 191 with a magnetic element attached to the rear side of the discharge electrode assembly 131 and install a reed switch in the chamber 193 of the discharge unit housing 13.

Figure 24:
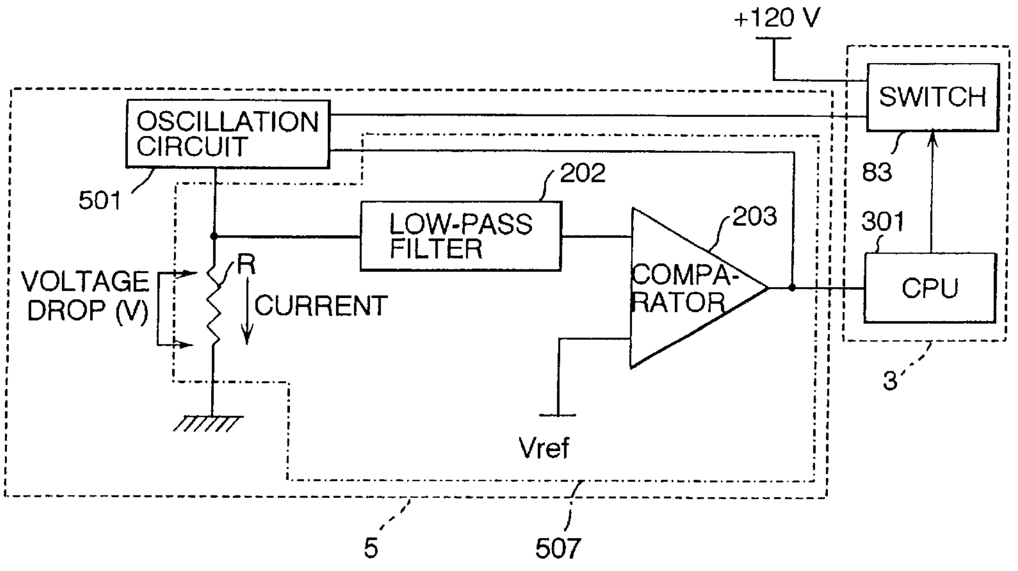
FIG. 24 is a schematic block diagram showing an over-current generation protection circuit according to the present invention.

The safety and protection features can also prevent the high-voltage generating circuit 501 from being damaged by an overcurrent. FIG. 24 shows an overcurrent protection circuit installed in the discharge unit 5 for rendering the high-voltage generating circuit 501 inactive so as to stop generation of a high voltage discharge when an overcurrent is detected. As shown, the overcurrent protection circuit comprises an overcurrent detection circuit 507 which includes a resistance R connected between the earth ground and the high-voltage generating circuit 501, a comparator 203 and a low-pass filter 202 disposed between the resistance and the comparator 203. A current across the resistance R is directed to the comparator 203 through the low pass-filter 202. A current level V is compared with a threshold current level Vref in the comparator 203. When the given current level V is higher than the threshold current level Vref, the comparator 203 provides the high-voltage generating circuit 501 with a control signal for rendering the high-voltage generating circuit 501 inactive. As a result, the high-voltage generating circuit 501 is rendered inactive thereby stopping the high voltage discharge. The control signal is sent to the CPU 301 of the control unit 3. When the CPU 301 receives the control signal, it forces the main power switch 83 to turn off Although the corona discharge apparatus 1 generates an instantaneous overcurrent immediately after it is powered on, the low-pass filter 202 shuts off this instantaneous overcurrent. Therefore, the low-pass filter 202 renders the overcurrent protection circuit sensitive to an instantaneous overcurrent that is generated either inevitably or accidentally during the operation of the corona discharge apparatus 1.

Figure 25:
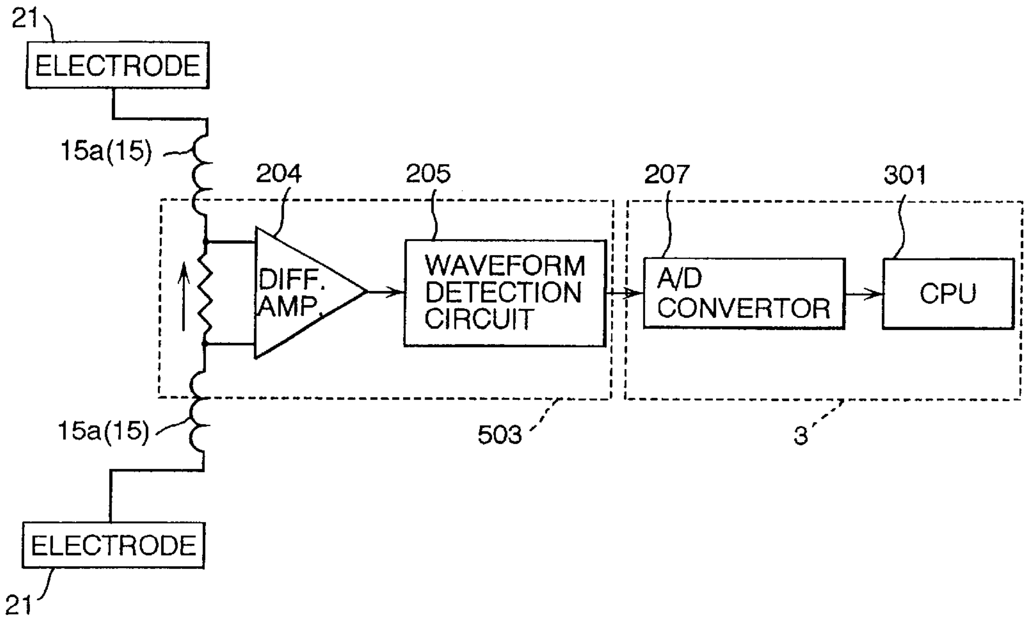
FIG. 25 is a schematic block diagram showing an extraordinary discharge prevention circuit according to the present invention.

The safety and protection features also prevent the occurrence of an extraordinary discharge. FIG. 25 shows an extraordinary discharge prevention circuit installed in the discharge unit 5. The extraordinary discharge prevention circuit comprises a discharge current detection circuit 503 that includes a differential amplifier circuit 204 and a waveform detection circuit 205. The differential amplifier circuit 204 amplifies a discharge current signal V across the secondary coil 15*a* of the high-frequency step-up transformer 15 and then sends the amplified discharge current signal V to the waveform detection circuit 205. After detecting a waveform of the discharge current signal V, an A/D conversion circuit 207 installed in the control unit 3 converts the discharge current signal V into a digital current. The A/D conversion circuit 207 forms a discharge current feedback circuit 317 in the control unit 3. On the basis of the digital current signal V, the CPU 301 in the control unit 3 performs the extraordinary discharge prevention control.

Figure 26:
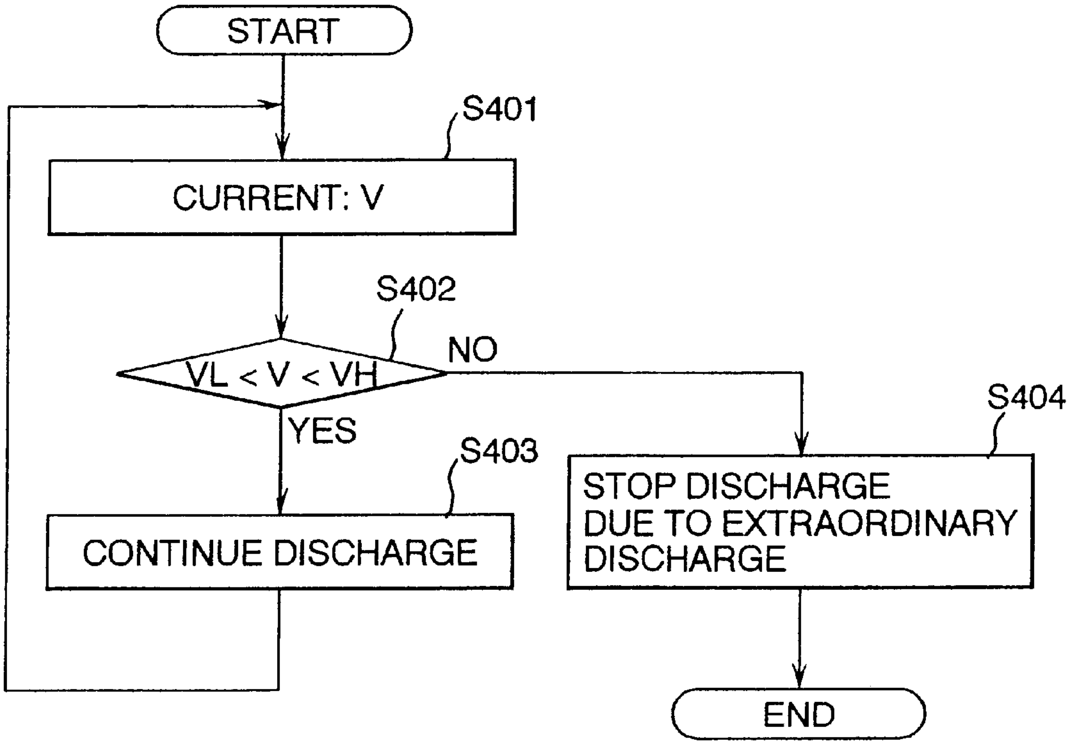
FIG. 26 is a flowchart illustrating a sequence routine for controlling and preventing an extraordinary discharge according to the present invention.

FIG. 26 shows a sequence routine for the extraordinary discharge prevention control. After reading the digital current signal V in step S401, a comparison is made in step S402 to determine whether the digital current signal V is between the respective upper and lower threshold currents VH and VL. When the digital current signal V is between the upper and lower threshold currents VH and VL, an ordinary discharge is detected. Thus the high discharge voltage continues to be applied to the discharge electrodes 21 in step S403. On the other hand, when the digital current signal V is higher than the upper threshold current VH or lower than the lower threshold current and VL, this indicates that a discharge is extraordinary. In this case, the CPU 301 provides the high-voltage generating circuit 501, including the oscillation circuit, with a shutdown signal for rendering it inactive so as to stop generation of the high voltage discharge in step S404.

There is the possibility of a discharge current signal being generated that is much lower than the lower threshold current due to a break in the wire of the high-frequency step-up transformer 15. For example, this could also occur when the discharge electrode assembly 131 is not attached to the discharge unit 5. On the other hand, there is also the possibility of a discharge current signal being generated that is much higher than the upper threshold current. For example, this could occur when the discharge electrodes 21 short-circuit because they are too close or when the high-frequency step-up transformer 15 is broken.

The corona discharge apparatus 1 is provided with a plasma treatment pattern alteration feature for altering the discharge among a plurality of predetermined patterns. As was previously described in connection with FIG. 10, repeated pushing of the plasma treatment pattern alteration switch S4, cyclically selects various control sequences for the available plasma treatment patterns from the memory 303. Specifically, when the plasma treatment pattern alteration switch S4 is repeatedly pushed, the LED plasma treatment pattern indicator 125 cyclically increments the single digit number between 1–7 to indicate specific plasma treatment patterns. It also accesses specific memory areas in the memory 303 where the data of the specific plasma treatment patterns are stored. The memory 303 stores data for the seven sequences of plasma treatment patterns in respective memory areas. The plasma treatment patterns comprise, for example, a plasma treating time that is taken to complete plasma treatment of a work object in the continuous operation mode. The plasma treatment pattern may comprise a gas flow rate from the discharge unit 5, a discharge strength, a plasma treating time or various combinations of the relevant parameters.

The plasma treating time is defined as the time the corona discharge apparatus 1 continuously provides a corona discharge between the operation of the start switch S6 and the stop switch S5. For example, when the work object takes a plasma treating time of 2.5 seconds to complete the plasma treatment in a continuous operation mode (which will be described later), the LED time indicator 105 displays "02.5" when the stop switch is pushed. When keeping the plasma treatment pattern alteration switch S4 pushed for at least a predetermined period of time, for example, two seconds while the LED time indicator 105 displays the plasma treating time, the data of the plasma treating time of 2.5 seconds displayed on the LED time indicator 105 is stored in a memory area designated by the plasma treatment pattern code number displayed on the LED plasma treatment pattern indicator 125. That is, the data in the memory area of the memory 303 is renewed whenever the plasma treatment pattern alteration switch S4 is pushed for longer than two seconds.

In a timer operation mode (which will be described later), when the plasma treatment pattern alteration switch S4 is quickly and repeatedly pushed it causes the required plasma treatment pattern code number to be displayed on the LED plasma treatment pattern indicator 125. The LED time indicator 105 displays a plasma treatment pattern, namely a plasma treating time in this embodiment, stored in the memory area of the memory 303 designated by the plasma treatment pattern code number, to appear on the LED plasma treatment pattern indicator 125. The CPU 301 performs the plasma treatment based on the plasma treatment pattern related to the plasma treatment pattern code number appearing on the LED plasma treatment pattern indicator 125. The use of the plasma treatment pattern memory function described above makes it easy to reliably set up a treatment pattern, i.e. a plasma treatment time in this embodiment, in the timer operation mode. For example, a plasma treatment time that is gained by properly performing trial plasma treatments in the continuous operation mode on a specific work object can be previously stored as a plasma treatment pattern indicated by a specific plasma treatment pattern code number in a given memory area of the memory 303. When it is intended to apply the plasma treatment to a work object that is the same kind as the specific work object used in making the plasma treatment pattern, the specific plasma treatment pattern is selected by using the plasma treatment pattern alteration switch S4 to designate the specific plasma treatment pattern code number. Then, when the corona discharge is started, the work is automatically treated using the specific plasma treatment pattern.

Figure 27:
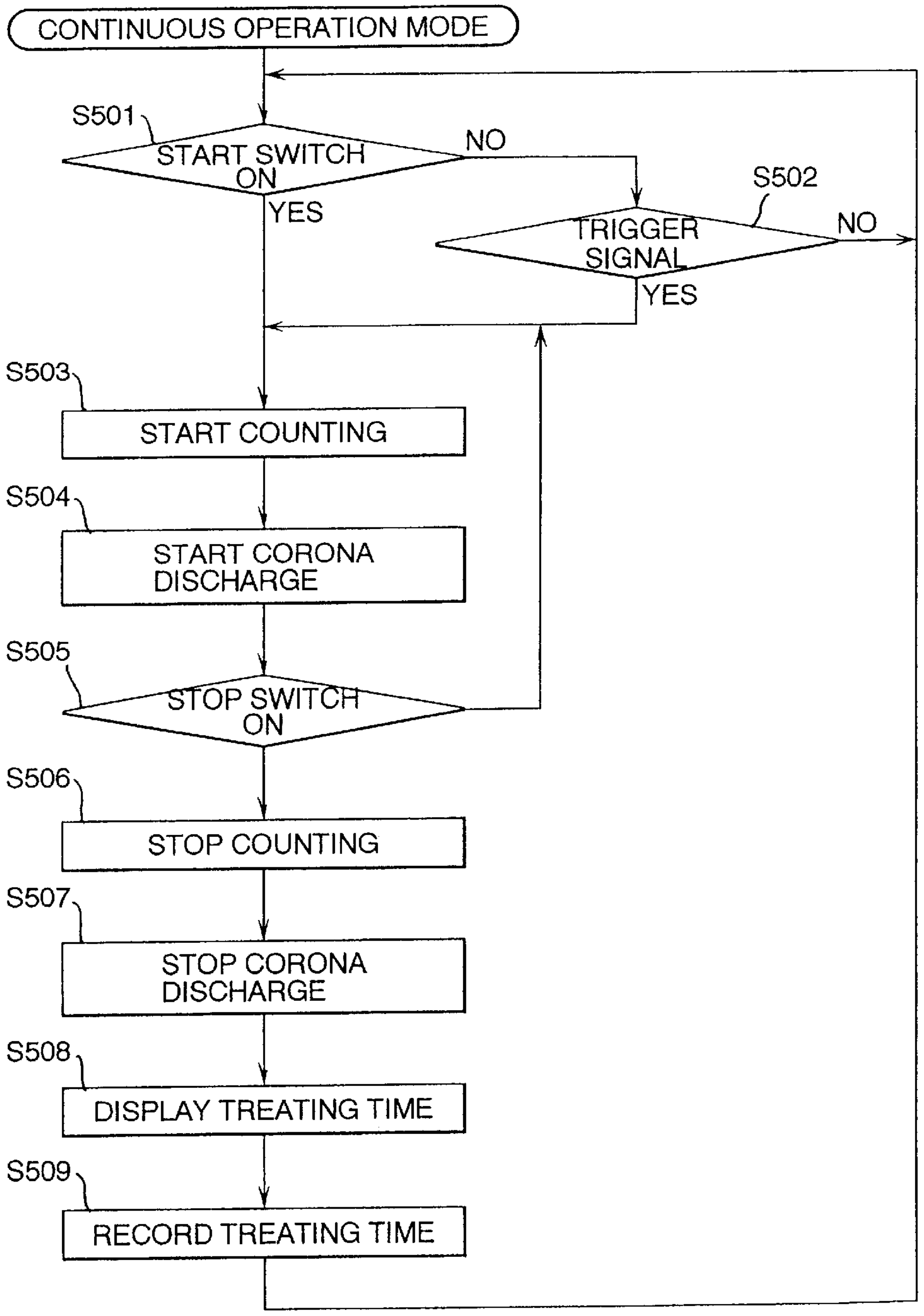
FIG. 27 is a flowchart illustrating a sequence routine for plasma treatment control when the corona discharge apparatus is operating in a continuous operation mode according to the present invention.

FIG. 27 is a flowchart illustrating a sequence routine for plasma treatment control in the continuous operation mode. When the flowchart logic commences, the control proceeds to a decision block in step S501 where it is determined whether the start switch S6 has been pushed. When it is determined that the start switch S6 has been pushed a time counter begins to count in step S503. When it is determined that the start switch S6 has not been pushed, the control proceeds to determine whether a trigger signal is present in step S502. If a trigger signal is determined to be present, the flow proceeds to step S503 and the time counter begins to count. Immediately after the time counter starts to count up the time in step S503, a corona discharge is caused in step S504. The trigger signal can be provided, for example, when a photoelectric switch (not shown) detects that a work object has been transported into the treating station. The photoelectric switch is known in various forms and any well-known form of photoelectric switch can be employed.

Thereafter, a decision is made in step S505 to determine whether the stop switch S5 has been pushed to terminate the corona discharge. When the stop switch S6 is pushed, the time counter is stopped in step S506 and then the corona discharge is stopped in step S507. At the end of the plasma treatment, the LED time indicator 105 displays the counted time as the plasma treating time Ttt on in step S508. The plasma treating time Ttt is also renewed and stored in a given memory area of the memory 303 in step S509.

In the continuous mode plasma treatment control, the renewal of a plasma treating time may also be achieved by keeping the plasma treatment pattern alteration switch S4 pushed for a predetermined time. Further, pushing the start switch S6 again may also continue the continuous mode plasma treatment. In this case, the time counter counts time in addition to the plasma treating time Ttt displayed on the LED time indicator 105. This is especially useful when the plasma treating time Ttt is too short to complete a work object. In this case, an additional continuous mode plasma treatment must be applied to the work and the total plasma treating time can be displayed on the LED time indicator 105. The total plasma treating time can also be stored in the memory 303 for renewal along with the previously stored plasma treating times.

Figure 28:
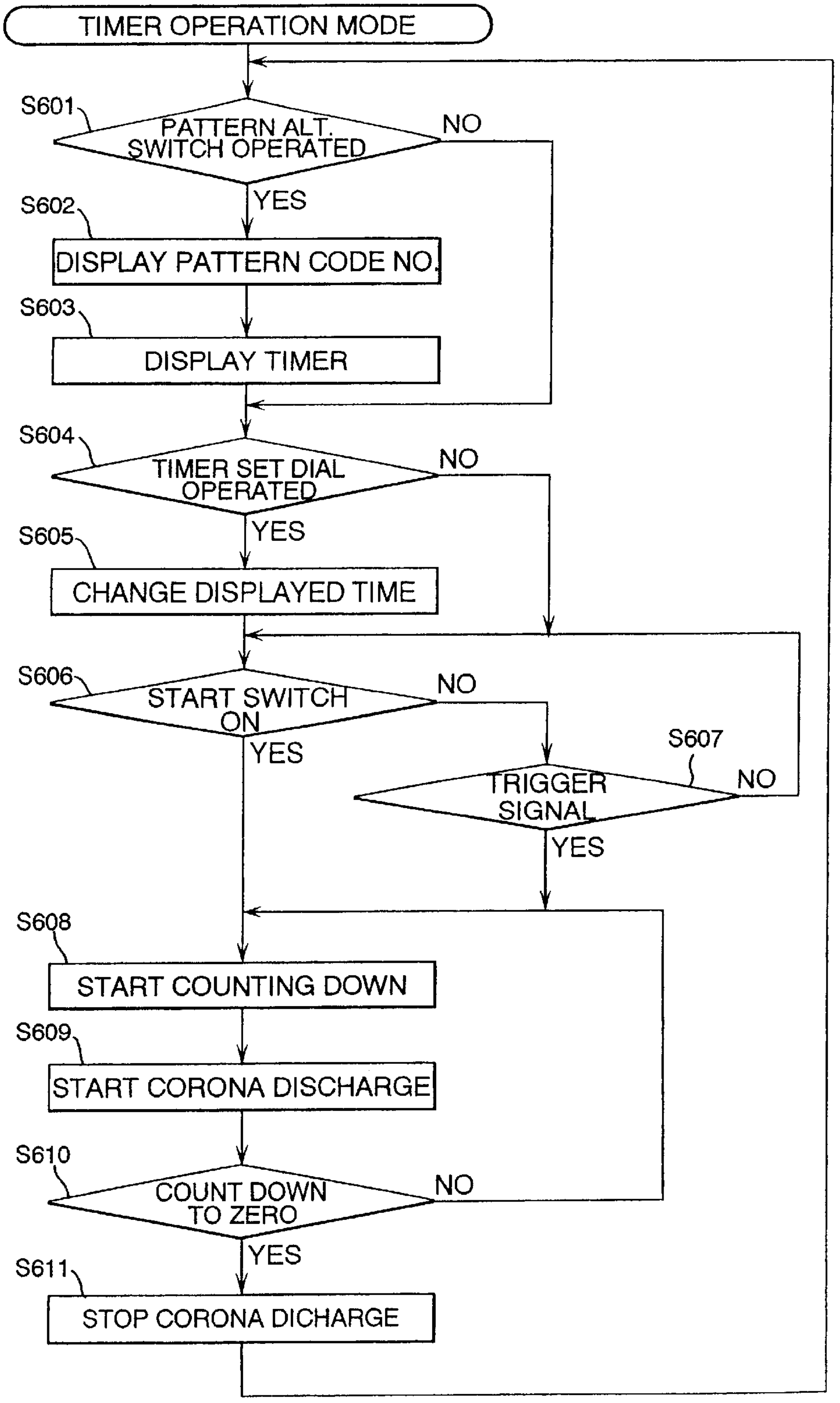
FIG. 28 is a flowchart illustrating a sequence routine for plasma treatment control when the corona discharge apparatus is operating in a timer operation mode according to the present invention.

FIG. 28 is a flowchart illustrating a sequence routine for plasma treatment control in the timer operation mode. The CPU 301 initially determines whether the plasma treatment pattern alteration switch S4 has been pushed, thereby selecting one of the available plasma treatment patterns, in step S601. If so, the CPU 301 causes the LED plasma treatment pattern indicator 125 to display the plasma treatment pattern code number representative of the selected plasma treatment pattern in step S602. Concurrently, the CPU 301 reads out the plasma treatment pattern data, i.e. data of the plasma treating time Ttt, from the memory area of the memory 301 to which the plasma treatment pattern code number displayed on the LED plasma treatment pattern indicator 125 is assigned. This plasma treatment pattern data is then displayed on the LED time indicator 105 so as to display the plasma treating time Ttt in step S603.

The timer switch S1 can also be manually operated, if necessary, to change the plasma treating time Ttt. In step S604, the CPU 301 determines whether the timer switch S1 has been operated. If the timer switch has been manually operated to change the plasma treating time Ttt, the changed time is displayed in step S605. For example, if the timer switch S1 is moved in a clockwise direction, the plasma treating time Ttt is decreased or shortened, which can be visually checked on the LED time indicator 105. On the other hand, if the timer switch S1 is moved in a counter-clockwise direction, the plasma treating time Ttt is increased or extended, which also can be visually checked on the LED time indicator 105.

Thereafter, a decision is made in step S606 to determine whether the start switch S6 has been pushed. When the start switch S6 has been pushed in step S606, the time counter begins to count down the plasma treating time Ttt in step S608. If the start switch S6 has not been pushed in step S606, it is determined whether the trigger signal is present in step S607. If the trigger signal is present, the time counter begins to count down the plasma treating time Ttt in step S608. Immediately after starting to count down the plasma treating time Ttt in step S608, the corona discharge is started in step S609. The plasma treating time Ttt displayed on the LED time indicator 105 then decreases. The corona discharge ends if it determined that the timer counter counted down to zero in step S610. If so, the LED time indicator 105 displays zero thereby providing an indication that the time is up, in step S611. If the stop switch S5 is pushed before the timer counts down to zero, the corona discharge is forcibly stopped.

In the timer mode plasma treatment control, the plasma treating time that is measured in the continuous mode plasma treatment control may be used. In this case, when the timer switch S1 is pushed longer than a predetermined time, for example two seconds, to alter the plasma treatment control from the continuous operation mode to the timer operation mode, the plasma treating time that is measured in the continuous mode plasma treatment control is used. The corona discharge is then controlled in the timer operation mode on the basis of this plasma treating time. In other words, the corona discharge may be controlled on the basis of the plasma treating time that is measured in the continuous mode plasma treatment control by pushing the start switch S6 after altering the plasma treatment control to the timer operation mode. In this case, the plasma treating time may be managed by turning off the main power switch 83.

The built-in high-voltage generating circuit 501 includes an oscillation circuit that is either an external-excitation type or a self-excitation type.

Figure 29:
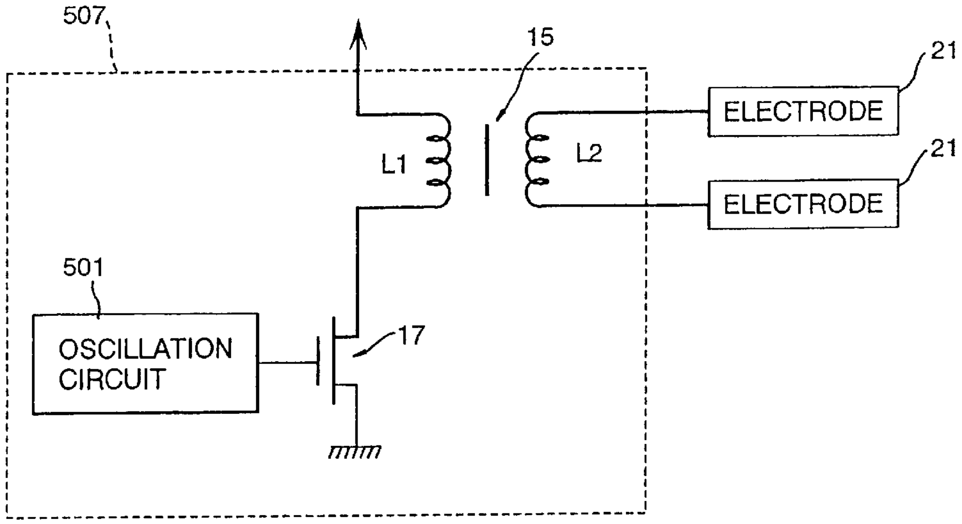
FIG. 29 is a schematic circuit diagram of a high-voltage generating circuit with an external-excitation type of oscillation circuit installed therein according to the present invention.

FIG. 29 shows the high-voltage generating circuit 501 with an external-excitation type of oscillation circuit installed therein. As shown, a switching element 17 such as a metal oxide semiconductor field effect transistor (MOSFET) is connected between the high-voltage generating circuit 501 and the primary coil L1 of the high-frequency step-up transformer 15. With the circuit configuration, a high voltage having a frequency meeting the inter-electrode property is efficiently obtained by applying a voltage having a specific waveform frequency generated by the high-voltage generating circuit 501 to a gate of the switching element 17.

Figure 30:
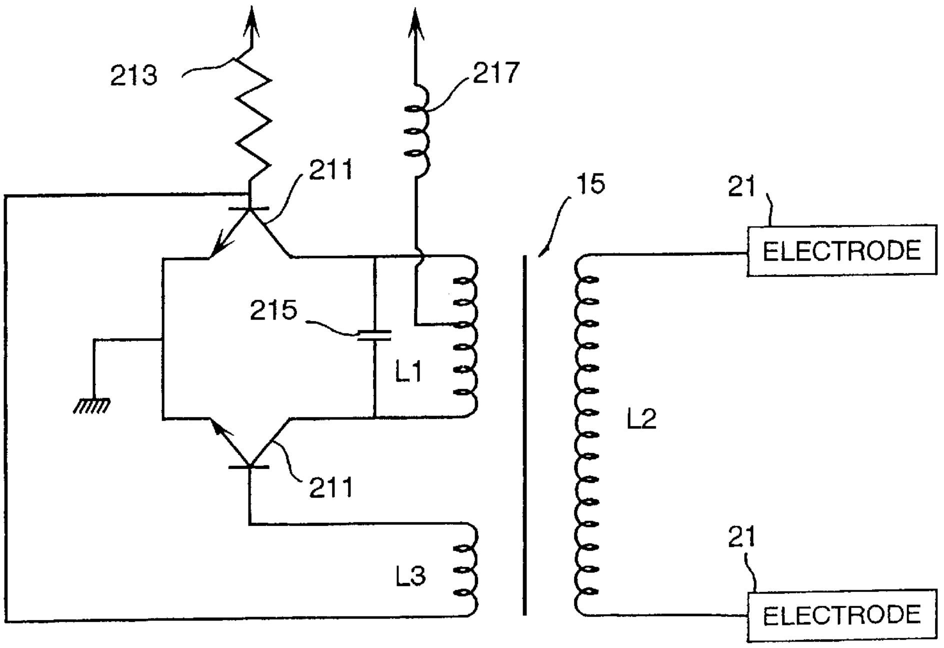
FIG. 30 is a schematic circuit diagram of a high-voltage generating circuit with a self-excitation type of oscillation circuit installed therein according to the present invention.

FIG. 30 shows the high-voltage generating circuit 501 with a self-excitation type of oscillation circuit installed therein. As shown, changing the voltage applied to a base of a transistor 211 through a resistance 213 triggers the high-frequency step-up transformer 15 to cause resonance. As a result, a current across the circuit including the primary coil L1 of the high-frequency step-up transformer 15 changes correspondingly. The resonant frequency can be determined by setting constants of the primary coil L1 and a capacitor 215 connected in parallel to the primary coil L1. Therefore, the constants of the primary coil L1 and the capacitor 215 are determined so as to generate a voltage having a frequency meeting the inter electrode property. A choke coil 217 is installed in the circuit to stabilize oscillation.

Figure 31:
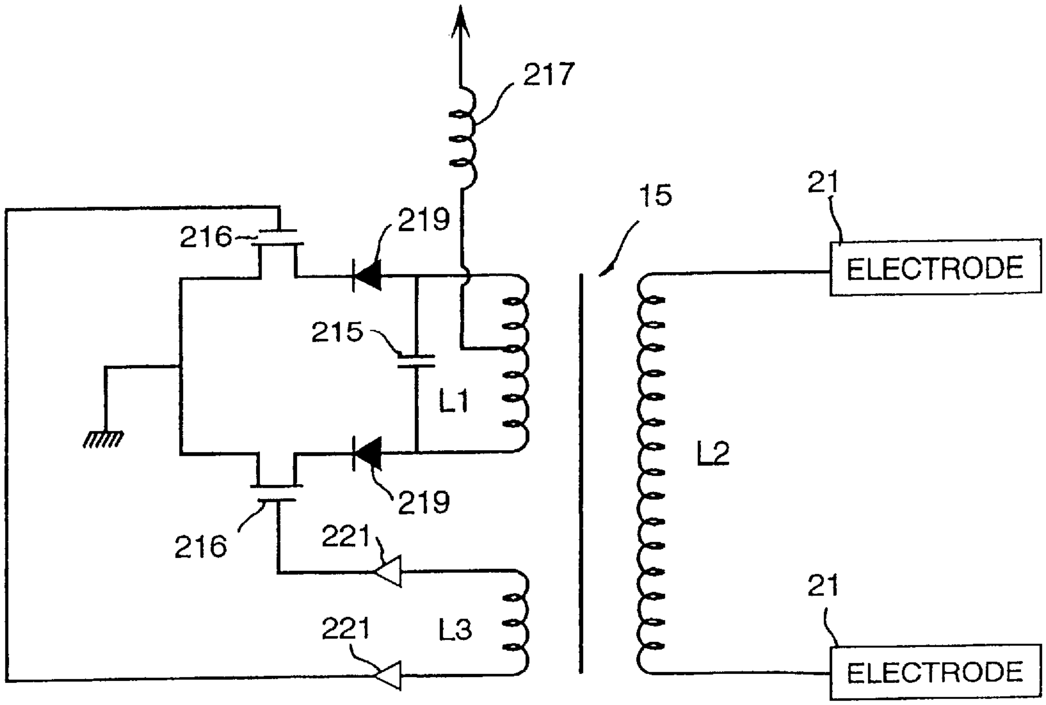
FIG. 31 is a schematic circuit diagram of another high-voltage generating circuit with a self-excitation type of oscillation circuit installed therein according to the present invention.

FIG. 31 shows a modification of the high-voltage generating circuit 501 with a self-excitation type of oscillation circuit installed therein. As shown, a field effect transistor (FET) 216 is substituted for the transistor 211 in order to increase the switching speed. This oscillation circuit is also provided with a diode 219 for cutting off a reverse current. Because this circuit needs to apply a relatively high voltage to the gate of the FET 217, it is preferable to have waveform shaping comparators 221 as shown in FIG. 31. Employing one of the oscillation circuits shown in FIGS. 29, 30 or 31 makes it possible to use a compact design for the high-frequency step-up transformer 15 thereby miniaturizing the discharge unit.

In the corona discharge apparatus, the automatic operation is set and its operating conditions changed by using switches S1 and S2. However, there is some apprehension that operators will operate the wrong switches during the setting of the automatic operation and/or during changing the automatic operation conditions. In order to avoid unintentionally setting any wrong conditions, the corona discharge apparatus 1 is preferably equipped with a wrong setting prevention feature.

Figure 32:
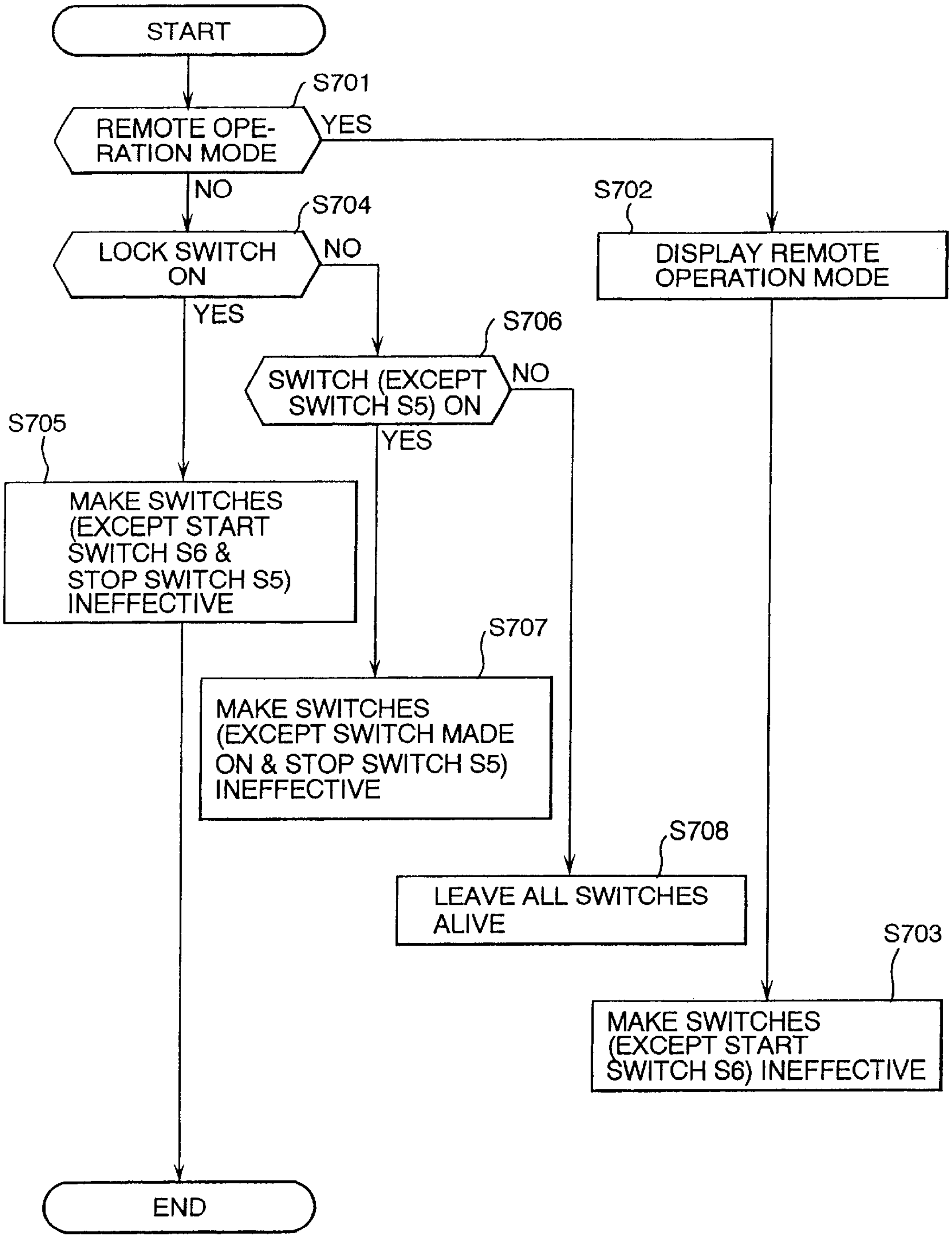
FIG. 32 is a flowchart illustrating a sequence routine for double switch operation lockout control according to the present invention.

FIG. 32 is a flowchart illustrating a sequence routine for double switch operation lockout control. Initially the flowchart logic proceeds to determine whether the corona discharge apparatus 1 is set in a remote operation mode in step S701. This decision is made on the basis of an external input that passes through one of the external input/output terminals 81 of the terminal arrangement 311 on the rear panel 43. When, for example, an external computer is connected to the corona discharge apparatus 1 in order to remotely control the corona discharge apparatus 1, the remote control lamp 111 on the front operating panel 41*a* is turned on to provide the operator with an indication that the apparatus is being remotely controlled in step S702. During the remote control operation, the switches S1–S4 and S6 are rendered ineffective in step S703. The discharge stop switch S5 is not rendered ineffective. Therefore, pushing any one of the ineffective switches S1–S4 and S6 causes nothing to the corona discharge apparatus 1. The discharge stop switch S5 is kept alive so it can be used as an emergency power cut-off switch.

When the corona discharge apparatus 1 is not being remotely controlled, a decision is made in step S704 to determine whether a lock switch (not shown) is on so as to prohibit alteration of plasma treatment conditions. The lock switch may be built into the control unit 3 or mounted as a manually operated switch on the rear panel 43. If it is determined that the lock switch is ON, the stop switch S5 and the start switch S6 are maintained active and the switches S1–S4 are rendered ineffective in step S705. As a result, rewriting or altering the plasma treatment conditions is prevented even if one of the switches S1–S4 is pushed. On the other hand, when the lock switch is determined to be OFF in step S704, it is subsequently determined whether one of the switches other than the stop switch S5 has been operated in step S706. If one of the switches other than the stop switch S5 has been operated, the remaining switches other than the stop switch S5 are rendered ineffective in step S707. When the lock switch is OFF, all switches are still active and allow the operator to manage the plasma treatment conditions. In this situation, it might be possible to try to operate two switches consecutively. However, because of steps S706 and S707, it is not possible to accidentally touch or operate another switch (except the stop switch S5) while one of the other switches is being operated in order to make the second operation of a switch ineffective. Even though double switch operation is prevented by this method, the stop switch S5 is maintained active and is given priority over the remaining switches. When any one of the switches other than the stop switch S5 is singly operated in step S706, all of the switches S1–S6 are maintained active in step S708. This allows the operator to intentionally govern the plasma treatment conditions.

FIG. 33 is a table of available plasma treatment condition setting patterns. As was previously mentioned, the corona discharge apparatus 1 has seven plasma treatment patterns or conditions. These conditions may comprise a plasma treating time, a gas flow rate, a discharge strength, or various combinations of them. It should be realized that other switches may also be provided for the convenience of setting other plasma treatment patterns or conditions. In such a case, the double switch operation lockout control can also be performed.

FIG. 34 schematically shows the plasma treatment by a multi-head corona discharge apparatus. As was described in connection with FIG. 2, the discharge unit housing 13 has the head housing section 13*b* offset toward the bottom of the main housing section 13*a* so that it is not coaxial with the longitudinal axis of the main housing section 13*a*. When a work object to be treated has a wide treatment surface area that needs to receive the plasma treatment, a plurality of the discharge units 3 can be transversely arranged, side-by-side to form a multi-head discharge unit. Thus, the discharge electrode assemblies 131 of the discharge units 5 are positioned far away from one another by positioning alternate discharge units upside down so that their discharge unit housings are arranged as shown by the solid and dashed lines in FIG. 2. This arrangement expands the distances between the respective adjacent discharge electrode assemblies 131. Therefore, this arrangement easily prevents an undesirable corona discharge from being generated between the respective adjacent discharge units 5. Furthermore, even when the discharge unit 5 has a relatively narrow width, the side-by-side alternately oriented multi-head arrangement reduces a required projection area to the minimum.

The following description is directed to the multi-head corona discharge apparatus that is used to apply the plasma treatment to a strip-like work object W. The work object W moves in a direction indicated by an arrow D. The work object W has, for example, a treatment surface area 223 that is to be plasma treated. The treatment surface area 223 has a width WL1 that is greater than an effective treating width WL2 of the individual discharge unit 5. In FIG. 34, the example shown has the width WL1 being twice the effective treating width WL2 of the individual discharge unit 5. In order to process the treatment surface area 223 of the work object W, two discharge units 5 are coupled together as a twin-head discharge unit so as to provide an effective treating width that is twice as wide as the effective treating width WL2 of the individual discharge unit 5. Thus this twin-head discharge unit can treat the complete width WL1 of the treatment surface area 223.

The discharge units 5 of a twin-head discharge unit are transversely arranged side by side with their housings oriented so that their respective discharge electrode assemblies 131 are positioned upside down with respect to each other as shown in FIG. 34. Then, the unit housings 13 at either one or both of their front and rear ends are connected together such as by a plurality of fastening bolts 227 into respective threaded bores 225 as shown in FIG. 2. In this twin-head discharge unit, the adjacent discharge units 5 are arranged so that their discharge electrode assemblies 131 are not positioned in a straight line transversely across the width of the treatment surface area 223 of the work object W but rather they are unevenly positioned in the moving direction of the work object W The threaded bores 225 form one type of positioning means for positioning the discharge units 5 with respect to each other. Various types of positioning means for positioning and coupling the discharge units 5 are known and may take any well-known form. For example, the discharge units 5 may be provided with a complementary fitting key and key-way connecting arrangement.

In general, the multi-head corona discharge apparatus comprises a plurality of discharge units 5 arranged transversely side-by-side. These discharge units 5 are configured so that the discharge electrode assemblies 131 of every other discharge unit 5 is positioned in a first straight line transversely across the treatment surface area 223 of the work object W. The discharge units 5 are also positioned so that the discharge electrode assemblies 131 of other discharge units 5 are positioned in a second straight line transversely across the treatment surface area 223 of the work object W. The first straight line and the second straight line are displaced from each other in the moving direction of the work object W. Accordingly, the discharge units 5 can be arranged so that adjacent discharge electrode assemblies 131 are separated by a distance L2 that is greater than a distance L1 which is measured between the discharge electrodes of each discharge electrode assembly 131 as shown in FIG. 34. This alternately uneven arrangement of the discharge units 5 prevents undesirable discharge between each adjacent discharge units 5 from occurring.

Plasma treatment using the twin-head discharge unit shown in FIG. 34 will now be described. The treatment surface area 233 of a work object W is subdivided into two adjacent sections 223*a* and 223*b*. These adjacent sections 223*a* and 223*b* are respectively allocated to the two discharge units 5. The two discharge units 5 apply plasma to the two adjacent sections 223*a* and 223*b* concurrently but at different locations that are spaced apart from each other by the distance L2. The cross hatched area of the treatment surface area 223*c* and 223*d* indicate the areas that have been plasma treated. The gas outlet port 25 of the discharge electrode assembly 131 is not limited to a sideways extending long length slot. The gas outlet port 25 may have many different configurations. For example, the gas outlet port 25 may be of a circular or an almost circular configuration as shown in FIG. 35A. It also may have a slot-like configuration extending at an angle so that it is slanted as shown in FIG. 35B. Further, the gas outlet port 25 may be a slot that is oriented vertically such as is shown in FIG. 35C. The configuration and position of the gas outlet port 25 can be determined based on the treatment surface area of the work objects, the treating speed, the work transfer speed, etc.

In the case of using a multi-head corona discharge apparatus, it is necessary to synchronously manage the plurality of discharge units 5. The synchronization of the discharge units 5 can be done by providing the control unit 3 or control units 3A, 3B, 3C with a trigger signal so as to cause synchronous operation of the control units when the work object W is detected to have arrived at a specified position. It is also possible to cause the control unit 3 or control units 3A, 3B and 3C to provide the discharge unit 5 or the respective discharge units 5A, 5B and 5C with start command signals when the control computer receives the trigger signal.

It is also possible to use one of the control units 3 as the main control unit for the discharge units 5 of the multi-head corona discharge apparatus. In this case, one of control units of a multi-head corona discharge apparatus is used as the main control unit and the remaining control units are used as the subsidiary control units. When the main control unit receives a trigger signal based on a work object W being detected as having arrived at a specified position, the main control unit provides the subsidiary control units with respective start command signals while simultaneously starting its own control.

Otherwise, one of the control units 3 for the discharge unit 5 of the multi-head corona discharge apparatus may be used as a main control unit and the remaining control units may be used as subsidiary control units. When the main control unit receives a trigger signal when an arrival of a work subject W at a specified position is detected and transfers data to the respective subsidiary control units, then the subsidiary control units receives start command signals and separately control their respective discharge units on the basis of the control data. In this type of synchronization control, the plasma treatment is started by delivering a trigger signal to all of the control units when a work object is detected to have entered a plasma treatment station.

The following description is for one example of a multi-head plasma treatment apparatus that has one main control unit and the remaining control units are subsidiary control units.

Figure 36:
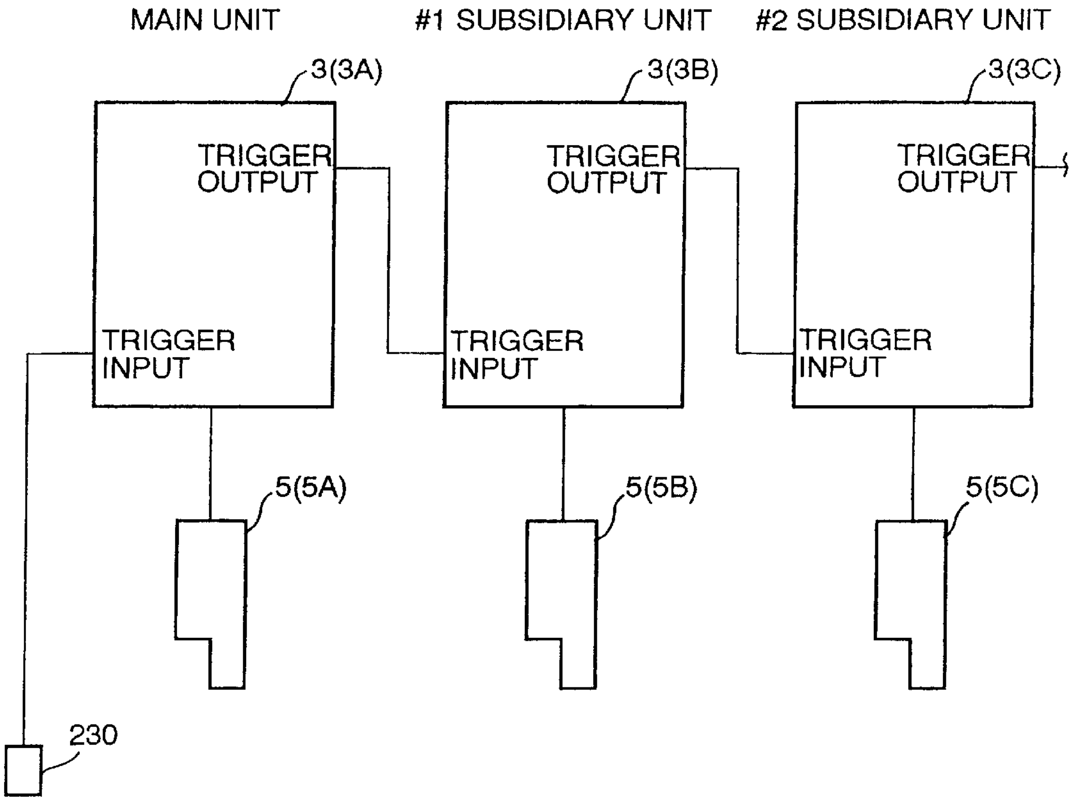
FIG. 36 is a schematic illustration showing synchronous control of a three-head corona discharge apparatus according to the present invention.
Figure 37:
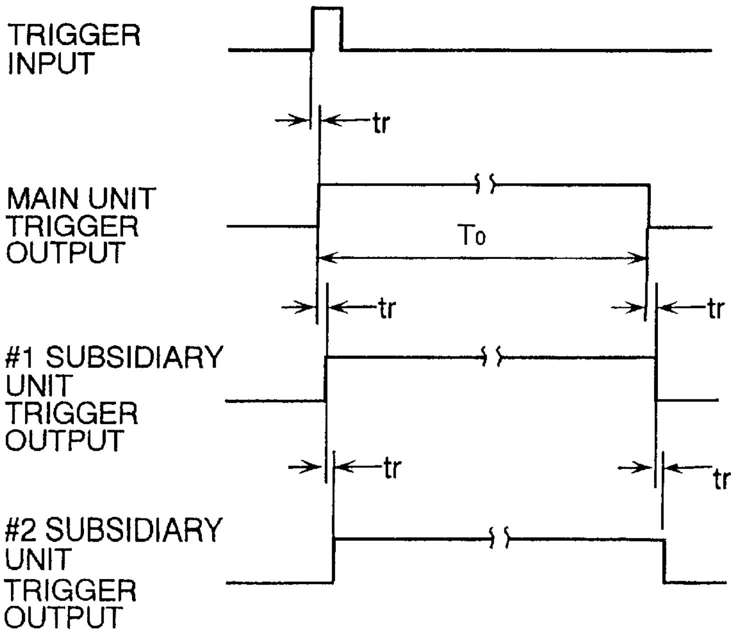
FIG. 37 is a time chart showing synchronous corona discharge using the three-head corona discharge apparatus according to the present invention.

FIGS. 36 and 37 show a synchronized multi-head corona discharge apparatus. This apparatus includes a main control unit 3A for one of three discharge units 5A. The main control unit 3A and the remaining subsidiary control units 3B and 3C (#1 and #2 subsidiary control units) are connected in series. It is possible to vary the number of control units and discharge units. A work sensor 226 is disposed in a specific position in the plasma treatment station and provides the main control unit 3A with a trigger signal when a work object W is detected as shown in FIG. 37. When the main control unit 3A receives the trigger signal, the oscillator control circuit 305 of the main control unit 3A provides the high-voltage generating circuit 501 with an oscillation start signal. Then, the high-voltage generating circuit 501 starts generating a high voltage with a time lag tr. The time lag tr is due to a response delay of the high-voltage generating circuit 501. The high voltage causes the discharge electrodes 21 of the discharge unit 5A to generate a corona discharge. The control unit 3A instructs the high-voltage generating circuit 501 of the discharge unit 5A to continue oscillation for a predetermined discharge duration time, i.e. a plasma treatment time To. After the plasma treating time To has elapsed, the oscillator control circuit 305 of the main control unit 3A provides the high-voltage generating circuit 501 with an oscillation stop signal. This causes the high-voltage generating circuit 501 to terminate oscillation and the corona discharge disappears thereby terminating that specific plasma treatment. In this embodiment, the time lag tr is approximately 10 ms, which has no practical influence on the plasma treatment.

When the high-voltage generating circuit 501 of the main control unit 3A starts generating a high voltage, the main control unit 3A provides the first subsidiary control unit (#1 subsidiary control unit) 3B with a trigger signal so that the oscillator control circuit 305 of the first subsidiary control unit 3B provides the high-voltage generating circuit 501 of the discharge unit 5B with an oscillation start signal. Then, the high-voltage generating circuit 501 starts generating a high voltage with a time lag tr and causes the discharge electrodes 21 of the discharge unit 5B to generate a corona discharge. The first subsidiary control unit 3B instructs the respective high-voltage generating circuit 501 to continue oscillation for the predetermined discharge duration time, i.e. the plasma treatment time To. After the plasma treating time To has elapsed, the respective oscillator control circuit 305 of the first subsidiary control unit 3B provides the high-voltage generating circuit 501 with an oscillation stop signal. This causes the high-voltage generating circuit 501 to terminate oscillation and the corona discharge disappears thereby terminating that specific plasma treatment. The same operation occurs sequentially with respect to the remaining subsidiary control units such as the second subsidiary control unit (#2 subsidiary control unit) 3C.

The synchronization of the discharge units 5 may also be achieved by transferring data of the plasma treatment conditions from the main control unit to the subsidiary control units. The transfer of the trigger signal between the adjacent control units 3A, 3B, 3C may be achieved by the use of an exclusive transfer line such as an RS232C line. For the synchronized operation of the discharge units, although it has been described that two of the terminals in the terminal arrangement 311 are allocated to input and output signals, it is also possible to arrange communication ports so that they are designed to the RS232 standard.

Figure 38:
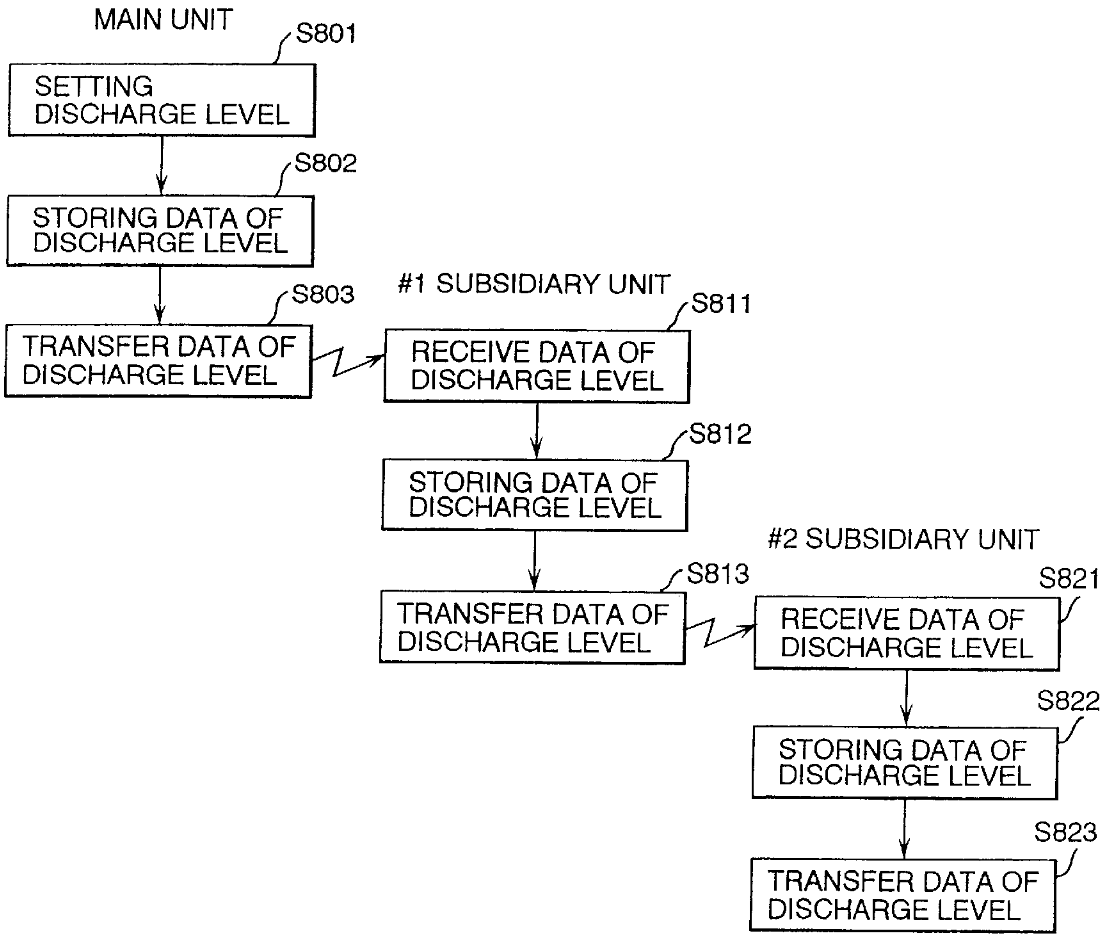
FIG. 38 is a flowchart illustrating a sequence routine for controlling the three-head corona discharge apparatus according to the present invention.

FIG. 38 is a flowchart illustrating a sequence routine for common control of a plurality of discharge units in a multi-head corona discharge apparatus. This control is achieved by transferring data of the plasma treating conditions. When the flowchart logic commences by setting up the main control unit 3A as shown in step S801. For example, a corona discharge level can be manually set. This can be done by setting a level of voltage that is applied to the discharge electrodes 21 of the discharge unit 5A. The level of voltage can be set by selecting one of the plasma treating programs stored in the memory 303. After the level of voltage is stored in a RAM portion of the memory 303 of the main control unit 3A in step S802, the main control unit 3A transfers the data of the level of the voltage waveform to the first subsidiary control unit 3B in step S803.

Thus the first subsidiary control unit (#1 subsidiary control unit) 3B receives the data of the set level for the voltage waveform in step S811. This data regarding the level of voltage is then stored in a RAM portion of the memory 303 of the first subsidiary control unit 3B in step S812. After which, the first subsidiary control unit 3B can transfer the data of the level of voltage to the second subsidiary control unit (#2 subsidiary control unit) 3C in step S813. In the same way, the third subsidiary control unit receives and stores the data of the level of voltage in a RAM portion of the memory 303 of the second subsidiary control unit 3C. It then transfers the data of the level of voltage to the following subsidiary control unit such as described in steps S821–823. With this common control routine, the multi-head corona discharge apparatus can perform the common control.

Figure 39:
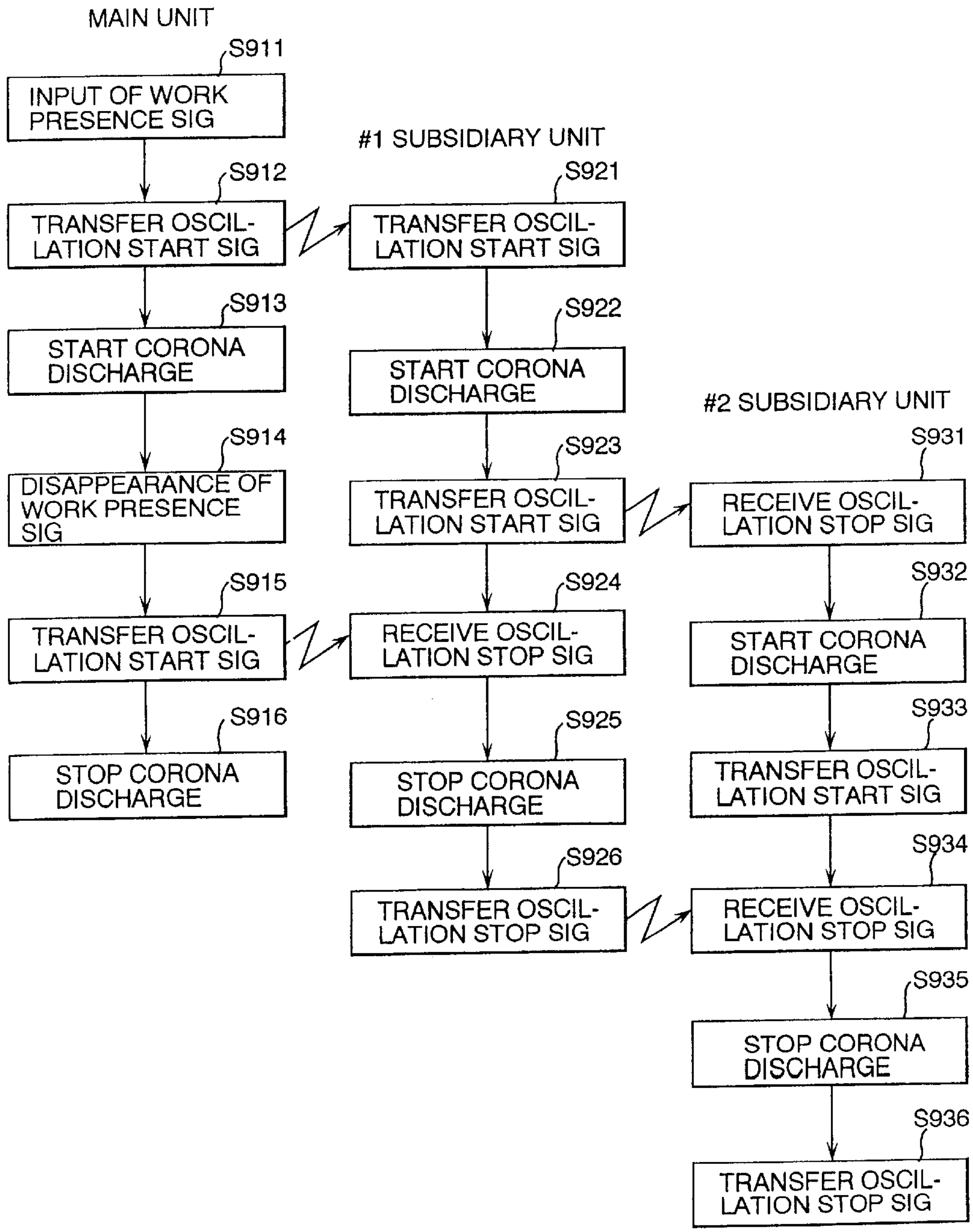
FIG. 39 is a flowchart illustrating a routine for synchronous control of the three-head corona discharge apparatus according to the present invention.

FIG. 39 is a flowchart illustrating a sequence routine for synchronous control of the multi-head corona discharge apparatus. In order to perform the synchronous control of the multi-head corona discharge apparatus, the plasma treating station is provided with work detection means (not shown) for detecting when a work object W enters the plasma treating station. The work detection means can continuously provide a work presence signal which is kept until the work object W leaves the plasma treatment station. In other words, the work detection means can provide the work presence signal as long as the work object is present in the plasma treating station.

When the flowchart logic commences and the main control unit 3A receives a work presence signal in step S911, the main control unit 3 A provides the first subsidiary control unit 3B with an oscillation start command signal in step S912. Also, the oscillator control circuit 305 of the main control unit 3A provides the high-voltage generating circuit 501 with an oscillation start signal in step S913. Then, the high-voltage generating circuit 501 starts generating a high voltage to cause the discharge electrodes 21 of the discharge unit 5A to generate a corona discharge. The control unit 3A instructs the high-voltage generating circuit 501 of the discharge unit SA to continue oscillation until the work presence signal disappears in step S914. Subsequent to the disappearance of the work presence signal, the main control unit 3A provides the first subsidiary control unit 3B with an oscillation stop command signal in step S915. Also, the oscillator control circuit 305 of the main control unit 3A removes the oscillation start signal causing the high-voltage generating circuit 501 to terminate generating the high voltage. This causes the discharge electrodes 21 of the discharge unit 5A to terminate the corona discharge in step S916.

The first subsidiary control unit 3B performs the same sequence as the main control unit 3A. It receives the oscillation start command signal and oscillation stop command signal from the main control unit 3A and progress through steps S921–S926. The remaining subsidiary control unit 3C performs the same sequence as the first subsidiary control unit 3B. It receives the oscillation start command signal and oscillation stop command signal from the first subsidiary control unit 3B and progresses through steps S931–S936.

It is to be understood that although the present invention has been described in detail with respect to the preferred embodiments thereof, various other embodiments and variants may occur to those skilled in the art, which are within the scope and spirit of the invention, and such other embodiments and variants are intended to be covered by the following claims.

What is claimed is:

1. A corona discharge apparatus for generating a corona discharge so as to modify a surface of a work object with plasma generating around the corona discharge, said corona discharge apparatus comprising:

a discharge unit comprising a discharge electrode assembly having at least two discharge electrodes and high-voltage generation means connected to said discharge electrode assembly for generating and applying a high-voltage to said discharge electrodes so as to generate a corona discharge between said discharge electrodes;

a control unit, separate from said discharge unit, for controlling generation of the corona discharge between said discharge electrodes of said discharge unit;

gas flow supply means for generating and supplying a gas flow between said discharge electrodes so as to swell the corona discharge outwardly from said discharge unit in an arc shape toward the surface of the work object; and coupling means for electrically coupling and uncoupling said high-voltage generation means and said control unit.

2. A corona discharge apparatus as defined in claim 1, wherein said coupling means comprises an electric cable connected to at least one of said control unit and said high-voltage generation means and a connector for detachably connecting said electric cable to another one of said control unit and said high-voltage generation means.

3. A corona discharge apparatus as defined in claim 1, wherein said gas flow supply means comprises a gas generator for generating a gas flow, a gas flow passage formed in said discharge unit so as to guide the gas flow between said discharge electrodes, and a connector for detachably connecting said gas generator to said gas flow passage.

4. A corona discharge apparatus as defined in claim 3, wherein said gas generator is installed in said control unit.

5. A corona discharge apparatus as defined in claim 3, wherein said gas supply source is disposed separately from both said control unit and said discharge unit.

6. A corona discharge apparatus as defined in claim 3, further comprising a gas flow sensor provided in said gas flow passage and operative to detect a flow rate of the gas flow in said gas flow passage and to provide a signal representative of a gas flow rate, wherein said control unit receives the signal from said gas flow sensor and feedback controls said gas supply source on the basis of the signal from said gas flow sensor so as to maintain a constant gas flow rate.

7. A corona apparatus as defined in claim 3, further comprising a temperature sensor disposed in said discharge unit and operative to detect an internal temperature of said discharge unit and to provide a signal representative of an internal temperature of said discharge unit, wherein said control unit receives the signal from said temperature sensor and controls generation of high-voltage by said high-voltage generating means on the basis of the signal from said temperature sensor.

8. A corona discharge apparatus as defined in claim 7, wherein said control unit prohibits said high voltage generation means from generating a high voltage when the internal temperature of said discharge unit is higher than a predetermined temperature.

9. A corona discharge apparatus as defined in claim 7, wherein said control unit prohibits said high voltage generation means from generating a high voltage when the internal temperature of said discharge unit is lower than a predetermined temperature.

10. A corona discharge apparatus as defined in claim 7, wherein said control unit prohibits said high-voltage generation means from generating a high voltage when said internal temperature of said discharge unit is beyond predetermined upper and lower temperatures.

11. A corona discharge apparatus as defined in claim 1, wherein said discharge electrode assembly is detachable from said discharge unit.

12. A corona discharge apparatus as defined in claim 11, further comprising detection means for detecting said discharge electrode assembly is detached from said discharge unit and for prohibiting said high voltage generation circuit from generating a high voltage when detecting said discharge electrode assembly is detached from said discharge unit.

13. A corona discharge apparatus for generating a corona discharge so as to modify a surface of a work object, said corona discharge apparatus comprising:

a discharge unit comprising a discharge electrode assembly having at least two discharge electrodes disposed in at least one electrode support and high-voltage generation means connected to said discharge electrode assembly for generating and applying a high-voltage to said discharge electrodes so as to generate a corona discharge between said discharge electrodes, said at least one electrode support having bores therein disposed substantially parallel to a longitudinal axis of said discharge electrode assembly so that a portion of said discharge electrodes disposed in the bores in said at least one electrode support are disposed substantially parallel to the longitudinal axis of said discharge electrode assembly;

a control unit, separate from said discharge unit, for controlling generation of the corona discharge between said discharge electrodes of said discharge unit; and coupling means for electrically coupling and uncoupling said high-voltage generation means and said control unit.

14. A corona discharge apparatus as defined in claim 13, further comprising gas flow supply means for generating and supplying a gas flow between said discharge electrodes so as to swell the corona discharge outwardly from said discharge unit in an arc shape toward the surface of the work object.

15. A corona discharge apparatus as defined in claim 13, wherein one end of each of said discharge electrodes is disposed adjacent a heat-resistant ceramic face plate.

16. A corona discharge apparatus as defined in claim 13, wherein one end of each of said discharge electrodes is bent inwardly toward a space between said discharge electrodes.

* * * * *